United States Patent
Faxér et al.

(10) Patent No.: US 10,469,142 B2
(45) Date of Patent: Nov. 5, 2019

(54) ADVANCED CSI REPORTING FOR HYBRID CLASS A/B OPERATION

(71) Applicant: Telefonaktiebolaget LM Ericsson (Publ), Stockholm (SE)

(72) Inventors: Sebastian Faxér, Järfälla (SE); Niklas Wernersson, Kungsängen (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 1 day.

(21) Appl. No.: 15/572,864

(22) PCT Filed: Sep. 29, 2017

(86) PCT No.: PCT/IB2017/056032
§ 371 (c)(1),
(2) Date: Nov. 9, 2017

(87) PCT Pub. No.: WO2018/060960
PCT Pub. Date: Apr. 5, 2018

(65) Prior Publication Data
US 2018/0375554 A1    Dec. 27, 2018

Related U.S. Application Data

(60) Provisional application No. 62/402,900, filed on Sep. 30, 2016.

(51) Int. Cl.
*H04B 7/0456* (2017.01)
*H04W 52/36* (2009.01)
*H04B 7/06* (2006.01)

(52) U.S. Cl.
CPC .......... *H04B 7/0478* (2013.01); *H04W 52/36* (2013.01); *H04B 7/065* (2013.01)

(58) Field of Classification Search
CPC ...... H04B 7/0478; H04B 7/065; H04W 52/36
See application file for complete search history.

(56) References Cited

U.S. PATENT DOCUMENTS

| | | | | |
|---|---|---|---|---|
| 2017/0134082 A1* | 5/2017 | Onggosanusi | ....... | H04B 7/0478 |
| 2017/0244533 A1* | 8/2017 | Onggosanusi | ....... | H04B 7/0478 |
| 2018/0034519 A1* | 2/2018 | Rahman | ............... | H04B 7/0456 |

OTHER PUBLICATIONS

International Search Report & Written Opinion of the International Searching Authority dated Jan. 16, 2018 issued in corresponding PCT Application Serial No. PCT/IB2017/056032, consisting of 12 pages.

(Continued)

*Primary Examiner* — Jaison Joseph
(74) *Attorney, Agent, or Firm* — Christopher & Weisberg, P.A.

(57) ABSTRACT

A method of determining a precoder from a first codebook, where said precoder determination comprises measuring on a set of beamformed antenna ports, and where the precoders in the first codebook share one or more common components with precoders in a second, multi-beam, codebook and where determining precoders from the second codebook comprises measuring on a larger set of, typically non-precoded, antenna ports.

16 Claims, 11 Drawing Sheets

(56) References Cited

OTHER PUBLICATIONS

3GPP TSG RAN WG1 Meeting #84bis, R1-163187, Source: Intel Corporation, Title: "CSI enhancements for hybrid FD-MIMO", Agenda item: 7.3.3.2.2 Document for: Discussion and Decision, Conference Location and Date: Busan, Korea, Apr. 11-15, 2016 consisting of 4-pages.

3GPP TSG RAN WG1 Meeting #85, R1-164860, Agenda Item: 6.2.3.2.2, Source: Huawei, HiSilicon, Title: "Discussion on Joint use of different types of CSI-RS", Document for: Discussion and Decision Conference Location and Date: Nanjing, China, May 23-27, 2016 consisting of 3-pages.

3GPP TSG-RAN WG1 #86, R1-166273, Agenda item: 7.2.4.2.2, Source: Qualcomm Incorporated, Title: "Discussion on CSI reporting for hybrid CSI-RS", Document for: Discussion and Decision, Conference Location and Date: Gothenburg, Sweden, Aug. 22-26, 2016 consisting of 3-pages.

\* cited by examiner

ADVANCED CSI REPORTING FOR HYBRID CLASS A/B OPERATION

CROSS-REFEREMCE TO RELATED APPLICATIONS

This application is a Submission Under 35 U.S.C. § 371 for U.S. Nation Stage Patent Application of International Application No. PCT/IB2017/056032, filed Sep. 29, 2017 entitled "ADVANCED CSI REPORTING FOR HYBRID CLASS A/B OPERATION ", which claimed priority to U.S. Provisional Application Ser. 62/402,900 filed Sep. 30, 2016 entitled "ADVANCED CSI REPORTING FOR HYBRID CLASS A/B OPERATION", the entireties of both of which are incorporated herein by reference.

TECHNICAL FIELD

Wireless communication and in particular, advanced CSI reporting targeting a use of hybrid non-precoded and beam-formed CSI reference signals.

BACKGROUND

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The 3GPP long term evolution (LTE) standard is currently evolving with enhanced MIMO support. A core component in LTE is the support of MIMO antenna deployments and MIMO related techniques. Currently LTE-Advanced supports an 8-layer spatial multiplexing mode for up to 16 transmit antennas with channel dependent precoding, and in LTE Rel. 14 support for up to 32 transmit antennas will be added. The spatial multiplexing mode is aimed for high data rates in favorable channel conditions. An illustration of the spatial multiplexing operation is provided in FIG. 1.

As seen, the information carrying symbol vector s 10 is multiplied by an $N_T \times r$ precoder matrix W, 12 which serves to distribute the transmit energy in a subspace of the $N_T$ (corresponding to $N_T$ antenna ports 14) dimensional vector space. The precoder matrix 12 is typically selected from a codebook of possible precoder matrices, and typically indicated by means of a precoder matrix indicator (PMI), which specifies a unique precoder matrix in the codebook for a given number of symbol streams. The r symbols in s 10 each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses OFDM in the downlink (and DFT precoded OFDM in the uplink) and hence the received NR×1 vector yn for a certain TFRE on subcarrier n (or alternatively data TFRE number n) is thus modeled by $$y_n = H_n W s_n + e_n \qquad \text{Equation 1}$$

where $e_n$ is a noise/interference vector obtained as realizations of a random process. The precoder W can be a wideband precoder, which is constant over frequency, or frequency selective.

The precoder matrix W 12 is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the wireless device. In addition, the precoder matrix 12 may also be selected to strive for orthogonalizing the channel, meaning that after proper linear equalization at the wireless device, the inter-layer interference is reduced.

One example method for a wireless device to select a precoder matrix W 12 can be to select the $W_k$ that maximizes the Frobenius norm of the hypothesized equivalent channel:

$$\max_k \| \hat{H}_n W_k \|_F^2 \qquad \text{Equation 2}$$

Where
$\hat{H}_n$ is a channel estimate, possibly derived from CSI-RS as described below.
$W_k$ is a hypothesized precoder matrix with index k.
$\hat{H}_n W_k$ is the hypothesized equivalent channel In closed-loop precoding for the LTE downlink, the wireless device transmits, based on channel measurements in the forward link (downlink), recommendations to the base station, e.g., eNodeB (eNB) of a suitable precoder to use. The base station configures the wireless device to provide feedback according to the wireless device's transmission mode, and may transmit CSI-RS and configure the wireless device to use measurements of CSI-RS to feedback recommended precoding matrices that the wireless device selects from a codebook. A single precoder that is supposed to cover a large bandwidth (wideband precoding) may be fed back. It may also be beneficial to match the frequency variations of the channel and instead feedback a frequency-selective precoding report, e.g., several precoders, one per subband. This is an example of the more general case of channel state information (CSI) feedback, which also encompasses feeding back other information that recommended precoders to assist the eNodeB in subsequent transmissions to the wireless device. Such other information may include channel quality indicators (CQIs) as well as transmission rank indicator (RI).

With regards to CSI feedback, a subband is defined as a number of adjacent PRB pairs. In LTE, the subband size (i.e., the number of adjacent PRB pairs) depends on the system bandwidth, whether CSI reporting is configured to be periodic or aperiodic, and feedback type (i.e., whether higher layer configured feedback or wireless device-selected subband feedback is configured). An example illustrating the difference between subband and wideband is shown in FIG. 2. In the example, the subband consists of 6 adjacent PRBs. Note that only 2 subbands are shown in FIG. 2 for simplicity of illustration. Generally, all the PRB pairs in the system bandwidth are divided into different subband where each subband consists of a fixed number of PRB pairs. In contrast, wideband involves all the PRB pairs in the system bandwidth. As mentioned above, a wireless device may feedback a single precoder that takes into account the measurements from all PRB pairs in the system bandwidth if it is configured to report wideband PMI by the base station. Alternatively, if the wireless device is configured to report subband PMI, a wireless device may feedback multiple precoders with one precoder per subband. In addition, to the subband precoders, the wireless device may also feedback the wideband PMI.

In LTE, two types of subband feedback types are possible for PUSCH CSI reporting: (1) higher layer configured subband feedback and (2) wireless device selected subband feedback. With higher layer configured subband feedback, the wireless device may feedback PMI and/or CQI for each of the subbands. The subband size in terms of the number of PRB pairs for higher layer configured subband feedback is a function of system bandwidth and is listed in Table 1. With wireless device selected subband feedback, the wireless device only feeds back PMI and/or CQI for a selected number of subbands out of all the subbands in the system bandwidth. The subband size in terms of the number of PRB pairs and the number of subbands to be fed back are a function of the system bandwidth and are listed in Table 2.

TABLE 1

| System Bandwidth $N_{RB}$ | Subband Size ($k_{sub}$) |
| --- | --- |
| 6-7 | NA |
| 8-10 | 4 |
| 11-26 | 4 |
| 27-63 | 6 |
| 64-110 | 8 |

TABLE 2

| System Bandwidth $N_{RB}^{DL}$ | Subband Size k (RBs) | Number of Subbands |
| --- | --- | --- |
| 6-7 | NA | NA |
| 8-10 | 2 | 1 |
| 11-26 | 2 | 3 |
| 27-63 | 3 | 5 |
| 64-110 | 4 | 6 |

Given the CSI feedback from the wireless device, the base station determines the transmission parameters it wishes to use to transmit to the wireless device, including the precoding matrix, transmission rank, and modulation and coding state (MCS). These transmission parameters may differ from the recommendations the wireless device makes. Therefore, a rank indicator and MCS may be signaled in downlink control information (DCI), and the precoding matrix can be signaled in DCI or the base station can transmit a demodulation reference signal from which the equivalent channel can be measured. The transmission rank, and thus the number of spatially multiplexed layers, is reflected in the number of columns of the precoder W. For efficient performance, it is important that a transmission rank that matches the channel properties is selected.

In LTE Release-10, a new reference symbol sequence was introduced for the intent to estimate downlink channel state information, the CSI-RS. The CSI-RS provides several advantages over basing the CSI feedback on the common reference symbols (CRS) which were used, for that purpose, in Releases 8-9. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a wireless device specific manner).

By measuring a CSI-RS transmitted from the base station, a wireless device can estimate the effective channel the CSI-RS is traversing including the radio propagation channel and antenna gains. In more mathematical rigor this implies that if a known CSI-RS signal x is transmitted, a wireless device can estimate the coupling between the transmitted signal and the received signal (i.e., the effective channel). Hence if no virtualization is performed in the transmission, the received signal Y can be expressed as $$y=Hx+e \qquad \text{Equation 3}$$

and the wireless device can estimate the effective channel H.

Up to eight CSI-RS ports can be configured in LTE Rel-10, that is, the wireless device can estimate the channel from up to eight transmit antenna ports. In LTE Release 13, the number of CSI-RS ports that can be configured is extended to up to sixteen ports. In LTE Release 14, supporting up to 32 CSI-RS ports is under consideration.

Related to CSI-RS is the concept of zero-power CSI-RS resources (also known as a muted CSI-RS) that are configured just as regular CSI-RS resources, so that a wireless device knows that the data transmission is mapped around those resources. The intent of the zero-power CSI-RS resources is to enable the network to mute the transmission on the corresponding resources in order to boost the signal-to-interference-plus-noise ratio (SINR) of a corresponding non-zero power CSI-RS, possibly transmitted in a neighbor cell/transmission point. For Rel-11 of LTE a special zero-power CSI-RS was introduced that a wireless device is mandated to use for measuring interference plus noise. A wireless device can assume that the serving eNB is not transmitting on the zero-power CSI-RS resource, and the received power can therefore be used as a measure of the interference plus noise.

Based on a specified CSI-RS resource and on an interference measurement configuration (e.g., a zero-power CSI-RS resource), the wireless device can estimate the effective channel and noise plus interference, and consequently also determine the rank, precoding matrix, and MCS to recommend to best match the particular channel In the previous description of CSI-RS, so called non-precoded CSI-RS was assumed. Meaning that one CSI-RS antenna port mapped to a single antenna element or antenna subarray of the antenna array. The CSI-RS in this case are then intended to be cell-specific, i.e., broadcasted over the entire cell coverage area. However, in LTE Rel. 13, a new type of CSI-RS transmitting scheme was introduced, so called beamformed (or precoded) CSI-RS. These CSI-RS are intended to be UE-specific instead of cell-specific, so that each wireless device is assigned a dedicated CSI-RS resource. Such beamformed CSI-RS typically contain much fewer ports than non-precoded CSI-RS and correspond to more narrow beams, as they are typically only intended to cover the wireless device of interest and not the entire cell coverage area. Using LTE terminology, non-precoded CSI-RS transmission schemes are denoted "Class A eMIMO-Type" while beamformed CSI-RS transmission schemes are denoted "Class B eMIMO-Type".

A problem with using the Class B approach is that the eNB needs to know how it should beamform the CSI-RS to the UE, i.e. in which direction to steer the beam. To solve this problem, a typical approach is to use so called Hybrid Class A/B operation, where in a first step a Class A CSI-RS with many antenna ports is transmitted by the eNB and a PMI report from a large dimension codebook is fed back by the wireless device to the eNB. The indicated precoder in the PMI thus indicates the best beam direction for the UE. In subsequent steps, the eNB transmits a Class B CSI-RS with few antenna ports to the UE, where the beamforming of the CSI-RS is based on the reported precoder in the Class A report. The eNB will typically transmit a Class A CSI-RS at certain intervals (e.g. with a periodicity 10-20 times larger than the Class B CSI-RS) in order to assure that the UEs desired beam direction has not changed.

Embodiments may be used with two dimensional antenna arrays and some of the presented embodiments use such antennas. Such antenna arrays may be (partly) described by the number of antenna columns corresponding to the horizontal dimension $N_h$, the number of antenna rows corresponding to the vertical dimension $N_v$ and the number of dimensions corresponding to different polarizations $N_p$. The total number of antennas is thus $N=N_h N_v N_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port.

An example of a 4×4 (i.e. four rows by four columns) array with cross-polarized antenna elements is shown in FIG. 3.

Precoding may be interpreted as multiplying the signal with different beamforming weights for each antenna prior to transmission. A typical approach is to tailor the precoder to the antenna form factor, i.e. taking into account $N_h$, $N_v$, and $N_p$ when designing the precoder codebook. A common type of precoding is to use a DFT-precoder, where the precoder vector used to precode a single-layer transmission using a single-polarized uniform linear array (ULA) with $N_1$ antennas is defined as $$w_{1D}(l, N_1, O_1) = \frac{1}{\sqrt{N_1}} \begin{bmatrix} e^{j2\pi \cdot 0 \cdot \frac{l}{O_1 N_1}} \\ e^{j2\pi \cdot 1 \cdot \frac{l}{O_1 N_1}} \\ \vdots \\ e^{j2\pi \cdot (N_1-1) \cdot \frac{l}{O_1 N_1}} \end{bmatrix} \quad \text{Equation 4}$$

where $l=0, 1, \ldots O_1 N_1 -1$ is the precoder index and $O_1$ is an integer oversampling factor. A precoder for a dual-polarized uniform linear array (ULA) with $N_1$ antennas per polarization (and so $2N_1$ antennas in total) can be similarly defined as $$w_{1D,DP}(l, N_1, O_1) = \begin{bmatrix} w_{1D}(l) \\ e^{j\phi} w_{1D}(l) \end{bmatrix} = \begin{bmatrix} w_{1D}(l) & 0 \\ 0 & w_{1D}(l) \end{bmatrix} \begin{bmatrix} 1 \\ e^{j\phi} \end{bmatrix} \quad \text{Equation 5}$$

where $e^{j\phi}$ is a co-phasing factor between the two polarizations that may for instance be selected from a QPSK alphabet $$\phi \in \left\{0, \frac{\pi}{2}, \pi, \frac{3\pi}{2}\right\}.$$

A corresponding precoder vector for a two-dimensional uniform planar arrays (UPA) with $N_1 \times N_2$ antennas can be created by taking the Kronecker product of two precoder vectors as $w_{2D}(l,m) = w_{1D}(l, N_1, O_1) \otimes w_{1D}(m, N_2, O_2)$, where $O_2$ is an integer oversampling factor in the $N_2$ dimension. Each precoder $w_{2D}(l,m)$ forms a 2D DFT beam, all the precoders $\{w_{2D}(l,m), l=0, \ldots, N_1 O_1-1; m=0, \ldots, N_2 O_2-1\}$ form a grid of DFT beams. An example is shown in FIG. 4, where $(N_1, N_2)=(4,2)$ and $(O_1, O_2)=(4,4)$. Each of the grid of DFT beams points to a spatial direction which can be described by a joint direction in azimuth and elevation. Throughout the following sections, the terms 'DFT beams' and 'DFT precoders' are used interchangeably.

More generally, a beam with an index pair (l,m) can be identified by the direction in which the greatest energy is transmitted when precoding weights $w_{2D}(l,m)$ are used in the transmission. Also, a magnitude taper can be used with DFT beams to lower the beam's sidelobes, the beam pattern at directions away from the main beam. A 1D DFT precoder along $N_1$ and $N_2$ dimensions with magnitude tapering can be expressed as $$w_{1D}(l, N_1, O_1, \beta) = \frac{1}{\sqrt{N_1}} \begin{bmatrix} \beta_0 e^{j2\pi \cdot 0 \cdot \frac{l}{O_1 N_1}} \\ \beta_1 e^{j2\pi \cdot 1 \cdot \frac{l}{O_1 N_1}} \\ \vdots \\ \beta_{N_1-1} e^{j2\pi \cdot (N_1-1) \cdot \frac{l}{O_1 N_1}} \end{bmatrix},$$

$$w_{1D}(m, N_2, O_2, \gamma) = \frac{1}{\sqrt{N_2}} \begin{bmatrix} \gamma_0 e^{j2\pi \cdot 0 \cdot \frac{m}{O_2 N_2}} \\ \gamma_1 e^{j2\pi \cdot 1 \cdot \frac{m}{O_2 N_2}} \\ \vdots \\ \gamma_{N_2-1} e^{j2\pi \cdot (N_2-1) \cdot \frac{m}{O_2 N_2}} \end{bmatrix}$$

Where $0 < \beta_i, \gamma_k \leq 1$ ($i=0, 1, \ldots, N_1-1; k=0, 1, \ldots, N_2-1$) are amplitude scaling factors. $\beta_i=1, \gamma_k=1$ ($i=0, 1, \ldots, N_1-1; k=0, 1, \ldots, N_2-1$) correspond to no tapering. DFT beams (with or without a magnitude taper) have a linear phase shift between elements along each of the two dimensions. Without loss of generality, one can assume that the elements of $w(l,m)$ are ordered according to $w(l,m)=w_{1D}(l, N_1, O_1, \beta) \otimes w_{1D}(m, N_2, O_2, \gamma)$ such that adjacent elements correspond to adjacent antenna elements along dimension $N_2$, and elements of $w(l,m)$ spaced $N_2$ apart correspond to adjacent antenna elements along dimension $N_1$. Then the phase shift between two elements $w_{s_1}(l,m)$ and $w_{s_2}(l,m)$ of $w(l,m)$ can be expressed as:

$$w_{s_2}(l, m) = w_{s_1}(l, m) \cdot \left(\frac{\alpha_{s_2}}{\alpha_{s_1}}\right) \cdot e^{j2\pi((k_1-i_1)\Delta_1 + (k_2-i_2)\Delta_2)}$$

Where $s_1 = i_1 N_2 + i_2$ and $s_2 = k_1 N_2 + k_2$ (with $0 \leq i_2 < N_2$, $0 \leq i_1 \leq N_1$, $0 \leq k_2 < N_2$, and $0 \leq k_1 < N_1$) are integers identifying two entries of the beam $w(l,m)$ so that $(i_1, i_2)$ indicates to a first entry of beam $w(l,m)$ that is mapped to a first antenna element (or port) and $(k_1, k_2)$ indicates to a second entry of beam $w(l,m)$ that is mapped to a second antenna element (or port).

$\alpha_{s_1} = \beta_{i_1} \gamma_{i_2}$ and $\alpha_{s_2} = \beta_{k_1} \gamma_{k_2}$ are real numbers. $\alpha_j \neq 1$ ($i=s_1, s_2$) if magnitude tapering is used; otherwise $\alpha_j=1$.

$$\Delta_1 = \frac{1}{O_1 N_1}$$

is a phase stint corresponding to a direction along an axis, e.g. the horizontal axis ('azimuth')

$$\Delta_2 = \frac{m}{O_2 N_2}$$

is a phase shift corresponding to direction along an axis, e.g. the vertical axis ('elevation')

Therefore a kth beam d(k) formed with precoder $w(l_k, m_k)$ can also be referred to by the corresponding precoder $w(l_k, m_k)$, i.e. $d(k)=w(l_k, m_k)$. Thus a beam d(k) can be described as a set of complex numbers, each element of the set being characterized by at least one complex phase shift such that an element of the beam is related to any other element of the beam where $d_n(k)=d_i(k)\alpha_{i,n}e^{j2\pi(P\Delta_{1,k}+q\Delta_{2,k})}=d_i(k)\alpha_{i,n}(e^{j2\pi(P\Delta_{1,k})})^p(e^{j2\pi(P\Delta_{2,k})})^q$, where $d_i(k)$ is the ith element of a beam d(k), $\alpha_{i,n}$ is a real number corresponding to the ith and nth elements of the beam d(k); p and q are integers; and $\Delta_{1,k}$ and $\Delta_{2,k}$ are real numbers corresponding to a beam with index pair $(l_k, m_k)$ that determine the complex phase shifts $e^{j2\pi\Delta_{1,k}}$ and $e^{j2\pi\Delta_{2,k}}$, respectively. Index pair $(l_k, m_k)$ corresponds to a direction of arrival or departure of a plane wave when beam d(k) is used for transmission or reception in a UPA or ULA. A beam d(k) can be identified with a single index k where $=l_k+N_1O_1m_k$, i.e, along vertical or $N_2$ dimension first, or alternatively $k=N_2O_2l_k+m_k$, i.e. along horizontal or $N_1$ dimension first.

An example of precoder elements of a beam w(l,m) to antenna ports mapping is shown in FIG. 5, where a single polarization 2D antenna with (N1,N2)=(4,2) is illustrated. $w_i(l,m)$ is applied on the transmit (Tx) signal to port i (i=1, 2, ..., 8). There is a constant phase shift between any two precoder elements associated with two adjacent antenna ports along each dimension. For example, with $\Delta_2$ defined as above, the phase shift between $w_1(l,m)$ and $w_2(l,m)$ is $e^{j2\pi\Delta_2}$, which is the same as the phase shift between $w_7(l,m)$ and $w_8(l,m)$. Similarly, with $\Delta_1$ defined as above, the phase shift between $w_2(l,m)$ and $w_4(l,m)$ is $e^{j2\pi\Delta_1}$, which is the same as the phase shift between $w_5(l,m)$ and $w_7(l,m)$.

Extending the precoder for a dual-polarized ULA may then be done as $$w_{2D,DP}(l, m, \phi) = \begin{bmatrix} 1 \\ e^{j\phi} \end{bmatrix} \otimes w_{2D}(l, m) = \begin{bmatrix} w_{2D}(l, m) \\ e^{j\phi} w_{2D}(l, m) \end{bmatrix} \quad \text{Equation 6}$$

$$= \begin{bmatrix} w_{2D}(l, m) & 0 \\ 0 & w_{2D}(l, m) \end{bmatrix} \begin{bmatrix} 1 \\ e^{j\phi} \end{bmatrix}$$

A precoder matrix $w_{2D,DP}$ for multi-layer transmission may be created by appending columns of DFT precoder vectors as $$W_{2D,DP}^{(R)} = [w_{2D,DP}(l_1, m_1, \phi_1) w_{2D,DP}(l_2, m_2, \phi_2) \ldots w_{2D,DP}(l_R, m_R, \phi_R)]$$

where R is the number of transmission layers, i.e. the transmission rank. In a special case for a rank-2 DFT precoder, $m_1=m_2=m$ and $l_1=l_2=l$, we have $$W_{2D,DP}^{(2)}(l, m, \phi_1, \phi_2) = [w_{2D,DP}(l, m, \phi_1) \; w_{2D,DP}(l, m, \phi_2)] \quad \text{Equation 7}$$

$$= \begin{bmatrix} w_{2D}(l, m) & 0 \\ 0 & w_{2D}(l, m) \end{bmatrix} \begin{bmatrix} 1 & 1 \\ e^{j\phi_1} & e^{j\phi_2} \end{bmatrix}$$

For each rank, all the precoder candidates form a 'precoder codebook' or a 'codebook'. A wireless device can first determine the rank of the estimated downlink wideband channel based CSI-RS. After the rank is identified, for each subband the wireless device then searches through all the precoder candidates in a codebook for the determined rank to find the best precoder for the subband. For example, in case of rank=1, the wireless device would search through $w_{2D,DP}(k,l,\phi)$ for all the possible $(k,l,\phi)$ values. In case of rank=2, the wireless device would search through $W_{2D,DP}^{(2)}(k,l,\phi_1,\phi_2)$ for all the possible $(k,l,\phi_1,\phi_2)$ values.

With multi-user MIMO, two or more users in the same cell are co-scheduled on the same time-frequency resource. That is, two or more independent data streams are transmitted to different wireless devices at the same time, and the spatial domain is used to separate the respective streams. By transmitting several streams simultaneously, the capacity of the system can be increased. This however, comes at the cost of reducing the SINR per stream, as the power has to be shared between streams and the streams will cause interference to each other.

When increasing the antenna array size, the increased beamforming gain will lead to higher SINR, however, as the user throughput depends only logarithmically on the SINR (for large SINRs), it is instead beneficial to trade the gains in SINR for a multiplexing gain, which increases linearly with the number of multiplexed users.

Accurate CSI is required in order to perform appropriate nullforming between co-scheduled users. In the current LTE Rel.13 standard, no special CSI mode for MU-MIMO exists and thus, MU-MIMO scheduling and precoder construction has to be based on the existing CSI reporting designed for single-user MIMO (that is, a PMI indicating a DFT-based precoder, a RI and a CQI). This may prove quite challenging for MU-MIMO, as the reported precoder only contains information about the strongest channel direction for a user and may thus not contain enough information to do proper nullforming, which may lead to a large amount of interference between co-scheduled users, reducing the benefit of MU-MIMO.

Advanced codebooks, for Class A operation, comprising precoders with multiple beams have been shown to improve MU-MIMO performance due to enhanced nullforming capabilities. Such multi-beam precoders may be defined as follows. We first define $D_N$ as a size N×N DFT matrix, i.e. the elements of $D_N$ are defined as $$[D_N]_{k,l} = \frac{1}{\sqrt{N}} e^{\frac{j2\pi kl}{N}}.$$

Further we define $R_N(q)=\text{diag}$ $$\left( \begin{bmatrix} e^{j2\pi \cdot 0 \cdot \frac{q}{N}} & e^{j2\pi \cdot 1 \cdot \frac{q}{N}} & \ldots & e^{j2\pi \cdot (N-1) \cdot \frac{q}{N}} \end{bmatrix} \right)$$

to be a size N×N rotation matrix, defined for $0 \leq q < 1$. Multiplying $D_N$ with $R_N(q)$ from the left creates a rotated DFT matrix with entries $$[R_N(q)D_N]_{k,l} = \frac{1}{\sqrt{N}} e^{\frac{j2\pi k(l+q)}{N}}.$$

The rotated DFT matrix $R_N(q)D_N=[d_1\ d_2\ \ldots\ d_N]$ consist of normalized orthogonal column vectors $\{d_i\}_{i=1}^N$ which furthermore span the vector space $\mathbb{C}^N$. That is, the columns of $R_N(q)D_N$, for any q, is an orthonormal basis of $\mathbb{C}^N$.

We begin with extending the (rotated) DFT matrices that were appropriate transforms for a single-polarized ULA as discussed above to also fit the more general case of dual-polarized 2D uniform planar arrays (UPAs).

We define a rotated 2D DFT matrix as $D_{N_V,N_H}(q_V,q_H)=(R_{N_H}(q_H)D_{N_H})\otimes(R_{N_V}(q_V)D_{N_V})=[d_1\ d_2\ \ldots\ d_{N_VN_H}]$. The columns $\{d_i\}_{i=1}^{N_{DP}}$ of $D_{N_V,N_H}(q_V,q_H)$ constitutes an orthonormal basis of the vector space $\mathbb{C}^{N_VN_H}$. Such a column $d_i$ is henceforth denoted a (DFT) beam, and we note that it fulfills the earlier definition of a beam given above.

Consider now a dual-polarized UPA, where the channel matrix $H=[H_{pol1}\ H_{pol2}]$. Create a dual-polarized beam space transformation matrix $$B_{N_V,N_H}(q_V,q_H) = I_2\otimes D_{N_V,N_H}(q_V,q_H) = \begin{bmatrix} D_{N_V,N_H}(q_V,q_H) & 0 \\ 0 & D_{N_V,N_H}(q_V,q_H) \end{bmatrix} = \begin{bmatrix} d_1 & d_2 & \ldots & d_{N_VN_H} & 0 & 0 & \ldots & 0 \\ 0 & 0 & \ldots & 0 & d_1 & d_2 & \ldots & d_{N_VN_H} \end{bmatrix} = [b_1\ b_2\ \ldots\ b_{2N_VN_H}].$$

The columns $\{d_i\}_{i=1}^{2N_VN_H}(q_V,q_H)$ constitutes an orthonormal basis of the vector space $\mathbb{C}^{2N_VN_H}$. Such a column $b_i$ is henceforth denoted a single-polarized beam (SP-beam) as it is constructed by a beam d transmitted on a single polarization $$\left(\text{i.e. } b = \begin{bmatrix} d \\ 0 \end{bmatrix} \text{ or } b = \begin{bmatrix} 0 \\ d \end{bmatrix}\right).$$

We also introduce a notation dual-polarized beam to refer to a beam transmitted on both polarizations (co-phased with an (arbitrary) co-phasing factor $e^{j\alpha}$, $$\text{i.e. } b_{DP} = \begin{bmatrix} d \\ e^{j\alpha}d \end{bmatrix}.$$

Utilizing the assumption that the channel is somewhat sparse, we can capture sufficiently much of the channel energy by only selecting a column subset of $B_{N_V,N_H}(q_V,q_H)$. That is, it is sufficient to describe a couple of the SP-beams, which keeps down the feedback overhead. So, we can select a column subset $I_S$ consisting of $N_{SP}$ columns of $B_{N_V,N_H}(q_V,q_H)$, to create a reduced beam space transformation matrix $B_{I_S}=[b_{I_S(1)}\ b_{I_S(2)}\ \ldots\ b_{I_S(N_{SP})}]$. E.g., one can select columns number $I_S=[1\ 5\ 10\ 25]$ to create the reduced beam space transformation matrix $B_{I_S}=[b_1\ b_5\ b_{10}\ b_{25}]$.

The most general precoder structure for precoding of a single layer is given as:

$$w = B_{I_S}\begin{bmatrix} c_1 \\ c_2 \\ \vdots \\ c_{N_{SP}} \end{bmatrix} = [b_{I_S(1)}\ b_{I_S(2)}\ \ldots\ b_{I_S(N_{SP})}]\begin{bmatrix} c_1 \\ c_2 \\ \vdots \\ c_{N_{SP}} \end{bmatrix} = \sum_{i=1}^{N_{SP}} c_i b_{I_S(i)},$$

where $\{c_i\}_{i=1}^{N_{SP}}$ are complex coefficients. A more refined multi-beam precoder structure is achieved by separating the complex coefficients in a power (or amplitude) and a phase part as $$w = B_{I_S}\begin{bmatrix} c_1 \\ c_2 \\ \vdots \\ c_{N_{SP}} \end{bmatrix} = B_{I_S}\begin{bmatrix} \sqrt{p_1}\,e^{j\alpha_1} \\ \sqrt{p_2}\,e^{j\alpha_2} \\ \vdots \\ \sqrt{p_{N_{SP}}}\,e^{j\alpha_{N_{SP}}} \end{bmatrix} =$$

$$B_{I_S}\begin{bmatrix} \sqrt{p_1} & 0 & & \\ 0 & \sqrt{p_2} & \ddots & \\ & \ddots & \ddots & 0 \\ & & 0 & \sqrt{p_{N_{SP}}} \end{bmatrix}\begin{bmatrix} e^{j\alpha_1} \\ e^{j\alpha_2} \\ \vdots \\ e^{j\alpha_{N_{SP}}} \end{bmatrix} = B_{I_S}\sqrt{P}\begin{bmatrix} e^{j\alpha_1} \\ e^{j\alpha_2} \\ \vdots \\ e^{j\alpha_{N_{SP}}} \end{bmatrix}$$

The precoder vector may then be expressed as $$w = \underbrace{B_{I_S}\sqrt{P}}_{=W_1}\begin{bmatrix} e^{j\alpha_1} \\ e^{j\alpha_2} \\ \vdots \\ e^{j\alpha_{N_{SP}}} \end{bmatrix}_{=W_2} = W_1 W_2.$$

The selection of $W_1$ may then be made on a wideband basis while the selection of $W_2$ may be made on a subband basis. The precoder vector for subband 1 may be expressed as $w_l=W_1W_2(l)$. That is, only $w_2$ is a function of the subband index 1.

As multiplying the precoder vector w with a complex constant C does not change its beamforming properties (as only the phase and amplitude relative to the other single-polarized beams is of importance), one may without loss of generality assume that the coefficients corresponding to e.g. SP-beam 1 is fixed to $p_l=1$ and $e^{j\alpha_1}=1$, so that parameters for one less beam needs to be signaled from the wireless device to the base station. Furthermore, the precoder may be further assumed to be multiplied with a normalization factor, so that e.g. a sum power constraint is fulfilled, i.e. that is $\|w\|^2=1$. Any such normalization factor is omitted from the equations herein for clarity.

What needs to be fed back by the wireless device to the base station is thus the chosen columns of $B_{N_V,N_H}(q_V,q_H)$, i.e. the $N_{SP}$ single-polarized beams. This requires at most $N_{SP}\cdot\log_2 2N_VN_H$ bits.

The vertical and horizontal DFT basis rotation factors $q_V$ and $q_H$. For instance, the $$q(i) = \frac{i}{Q},$$

i=0, 1, ..., Q−1, for some value of Q. The corresponding overhead would then be $2\cdot\log_2 Q$ bits.

The (relative) power levels $\{p_2, p_3, \ldots, p_{N_{SP}}\}$ of the SP-beams. If L is the number of possible discrete power levels, $(N_{SP}-1)\cdot\log_2 L$ bits are needed to feed back the SP-beam power levels.

The co-phasing factors $$\{e^{j\alpha_2}, e^{j\alpha_3}, \ldots, e^{j\alpha_{N_{SP}}}\}$$

of the SP-beams. For instance, $$\alpha(k) = \frac{2\pi k}{K},$$

k=0, 1, . . . , K−1, for some value of K. The corresponding overhead would be, $(N_{SP}-1) \cdot \log_2 K$ bits per rank per W2 report.

In some implementations, the phases of the SP-beams may be quantized across frequency. We assume that a multi-beam precoder vector $w_f$ for each PRB f=0, 1, . . . , $N_{RB}-1$ should be quantized and fed back and that the multi-beam precoder vector is a function of the SP-beam phases as $$w_f = B_{I_s} \sqrt{P} \begin{bmatrix} e^{j\alpha_1(f)} \\ e^{j\alpha_2(f)} \\ \vdots \\ e^{j\alpha_{N_{SP}}(f)} \end{bmatrix}.$$

Note here again that one may set $e^{j\alpha_1(f)}=1$ as only the relative phases are important. We are interested in characterizing the phase change over frequency for each SP-beam, that is, the vectors $\phi_i = [e^{j\alpha_i(0)} \ e^{j\alpha_i(1)} \ \ldots \ e^{j\alpha_i(N_{RB}-1)}]^T$, i=2, 3, . . . , $N_{SP}$.

Existing solutions for MU-MIMO based on implicit CSI reports with DFT-based precoders have problems with accurately estimating and reducing the interference between co-scheduled users, leading to poor MU-MIMO performance.

Multi-beam precoder schemes, such as the one presented previously, may lead to better MU-MIMO performance. However, these precoder schemes are designed for Class A type of operation with non-precoded CSI-RS. It is an open question how precoder design for Class B type of operation with beamformed CSI-RS should be done, especially considering when used in a Hybrid Class A/B fashion.

SUMMARY

Some embodiments advantageously provide a method, a radio network node, a wireless device, and user equipment for advanced CSI reporting targeting a use of hybrid non-precoded and beamformed CSI reference signals. According to one aspect, a method for a radio network node is provided. At least one precoder from a first codebook is determined by the radio network node by measuring on a set of beamformed antenna ports. At least one precoder from a second, multi-beam, codebook is determined by the radio network node by measuring on a set of non-precoded antenna ports that is larger than the set of beamformed antenna ports. The at least one precoder in the first codebook shares one or more common components with the at least one precoder in the second codebook.

According to this aspect, in some embodiments, the one or more common components comprise a beam power scaling component and/or a beam phase scaling component. In some embodiments, the beam power scaling component of a first precoder of the at least one precoder is selected on a wideband basis and/or the beam phase scaling component is selected on a subband basis. In some embodiments, the one or more common components comprise a beam phase scaling component and the said second codebook comprises a beam power scaling component. In some embodiments, a power scaling component comprised in a second precoder reported by a wireless device is used to scale a power level on the beamformed antenna ports by the transmitting radio network node. In some embodiments, the beam power scaling component of the second precoder reported by the wireless device is applied by the wireless device on the beamformed antenna ports before determining the first precoder. In some embodiments, an antenna port power scaling is signaled by the radio network node to the wireless device.

According to another aspect, a method for a wireless device is provided. A first codebook is accesses by the wireless device. The first codebook is a multi-beam codebook comprising a plurality of components. A second codebook is accessed by the wireless device. The second codebook comprises of a subset of the plurality of components from the first codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component. In some embodiments, the beam power scaling component in a precoder from the first codebook reported by the wireless device is applied by the wireless device on the beamformed antenna ports before determining a precoder from the second codebook. In some embodiments, an antenna port power scaling is signaled by a radio network node to the wireless device.

According to yet another aspect, a method for a radio network node is provided. At least one precoder from a first codebook is determined by measuring on a set of beamformed antenna ports. The at least one precoder in the first codebook shares one or more common components with the at least one precoder in a second, multi-beam, codebook. The radio network node is one of a radio access node and a wireless device.

According to this aspect, in some embodiments, the one or more common components comprise a beam power scaling component and/or a beam phase scaling component. In some embodiments, the beam power scaling component of a first precoder of the at least one precoder is selected on a wideband basis and/or the beam phase scaling component is selected on a subband basis. In some embodiments, the one or more common components comprise a beam phase scaling component and the said second codebook comprises a beam power scaling component. In some embodiments, a power scaling component comprised in a second precoder reported by a wireless device is used to scale the power level on the beamformed antenna ports by the transmitting radio network node. In some embodiments, the beam power scaling component of the second precoder reported by the wireless device is applied by the wireless device on the beamformed antenna ports before determining the first precoder. In some embodiments, an antenna port power scaling is signaled by the radio network node to the wireless device.

According to another aspect, a method for a wireless device is provided. A first codebook is accessed by the wireless device. The first codebook is a multi-beam codebook comprising a plurality of components. A subset of the plurality of components from the first codebook is within a second codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component. In some embodiments, the beam power scaling component in a precoder from the first codebook reported on the beamformed antenna ports is applied before determining a precoder from the second codebook. In some embodiments, an antenna port power scaling signaled (directly or indirectly) from a radio network node is received.

According to yet another aspect, a radio network node comprising processing circuitry is provided. The processing circuitry is configured to determine at least one precoder from a first codebook by measuring on a set of beamformed antenna ports. The processing circuitry is further configured to determine at least one precoder from a second, multi-beam by measuring on a set of non-precoded antenna ports that is larger than the set of beamformed antenna ports. The at least one precoder in the first codebook sharing one or more common components with the at least one precoder in the second codebook.

According to this aspect, in some embodiments, the one or more common components comprise a beam power scaling component and/or a beam phase scaling component. In some embodiments, the beam power scaling component of a first precoder of the at least one precoder is selected on a wideband basis and/or the beam phase scaling component is selected on a subband basis. In some embodiments, the one or more common components comprise a beam phase scaling component and the said second codebook comprises a beam power scaling component.

According to another aspect, a wireless device comprising processing circuitry is provided. The processing circuitry is configured to access a first codebook. The first codebook is a multi-beam codebook comprising a plurality of components. The processing circuitry is further configured to access a second codebook. The second codebook comprises a subset of the plurality of components from the first codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to yet another aspect, a radio network node comprising processing circuitry is provided. The processing circuitry is configured to determine at least one precoder from a first codebook by measuring on a set of beamformed antenna ports. The at least one precoder in the first codebook shares one or more common components with at least one precoder in a second, multi-beam, codebook.

According to this aspect, in some embodiments, the one or more common components comprise a beam power scaling component and/or a beam phase scaling component. In some embodiments, the beam power scaling component of a first precoder of the at least one precoder is selected on a wideband basis and/or the beam phase scaling component is selected on a subband basis. In some embodiments, the one or more common components comprise a beam phase scaling component and the said second codebook comprises a beam power scaling component.

According to yet another aspect, a wireless device comprising processing circuitry is provided. The processing circuitry is configured to access a first codebook. The first codebook is a multi-beam codebook comprising a plurality of components. A subset of the plurality of components from the first codebook is within a second codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to one aspect, a method for a base station is provided. At least one precoder from a first codebook is determined by the base station by measuring on a set of beamformed antenna ports. At least one precoder from a second, multi-beam, codebook is determined by the base station by measuring on a set of non-precoded antenna ports that is larger than the set of beamformed antenna ports. The at least one precoder in the first codebook shares one or more common components with the at least one precoder in the second codebook.

According to this aspect, in some embodiments, the one or more common components comprise a beam power scaling component and/or a beam phase scaling component. In some embodiments, the beam power scaling component of a first precoder of the at least one precoder is selected on a wideband basis and/or the beam phase scaling component is selected on a subband basis. In some embodiments, the one or more common components comprise a beam phase scaling component and the said second codebook comprises a beam power scaling component.

According to another aspect, a method for a user equipment is provided. A first codebook is accesses by the user equipment. The first codebook is a multi-beam codebook comprising a plurality of components. A second codebook is accessing by the user equipment. The second codebook comprises of a subset of the plurality of components from the first codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to yet another aspect, a method for a base station is provided. At least one precoder from a first codebook is determined by measuring on a set of beamformed antenna ports. The at least one precoder in the first codebook shares one or more common components with the at least one precoder in a second, multi-beam, codebook. The base station is one of a radio access node and a user equipment.

According to this aspect, in some embodiments, the one or more common components comprise a beam power scaling component and/or a beam phase scaling component. In some embodiments, the beam power scaling component of a first precoder of the at least one precoder is selected on a wideband basis and/or the beam phase scaling component is selected on a subband basis. In some embodiments, the one or more common components comprise a beam phase scaling component and the said second codebook comprises a beam power scaling component.

According to another aspect, a method for a user equipment is provided. A first codebook is accessed by the user equipment. The first codebook is a multi-beam codebook comprising a plurality of components. A subset of the plurality of components from the first codebook is within a second codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to yet another aspect, a base station comprising processing circuitry is provided. The processing circuitry is configured to determine at least one precoder from a first codebook by measuring on a set of beamformed antenna ports. The processing circuitry is further configured to determine at least one precoder from a second, multi-beam by measuring on a set of non-precoded antenna ports that is larger than the set of beamformed antenna ports. The at least one precoder in the first codebook sharing one or more common components with the at least one precoder in the second codebook.

According to this aspect, in some embodiments, the one or more common components comprise a beam power scaling component and/or a beam phase scaling component. In some embodiments, the beam power scaling component of a first precoder of the at least one precoder is selected on a wideband basis and/or the beam phase scaling component is selected on a subband basis. In some embodiments, the one or more common components comprise a beam phase scaling component and the said second codebook comprises a beam power scaling component.

According to another aspect, a user equipment comprising processing circuitry is provided. The processing circuitry is configured to access a first codebook. The first codebook is a multi-beam codebook comprising a plurality of components. The processing circuitry is further configured to access a second codebook. The second codebook comprises a subset of the plurality of components from the first codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to yet another aspect, a base station comprising processing circuitry is provided. The processing circuitry is configured to determine at least one precoder from a first codebook by measuring on a set of beamformed antenna ports. The at least one precoder in the first codebook shares one or more common components with at least one precoder in a second, multi-beam, codebook.

According to this aspect, in some embodiments, the one or more common components comprise a beam power scaling component and/or a beam phase scaling component. In some embodiments, the beam power scaling component of a first precoder of the at least one precoder is selected on a wideband basis and/or the beam phase scaling component is selected on a subband basis. In some embodiments, the one or more common components comprise a beam phase scaling component and the said second codebook comprises a beam power scaling component.

According to yet another aspect, a user equipment comprising processing circuitry is provided. The processing circuitry is configured to access a first codebook. The first codebook is a multi-beam codebook comprising a plurality of components. A subset of the plurality of components from the first codebook is within a second codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to yet another aspect, a radio network node comprising processing circuitry is provided. The processing circuitry comprises memory and one or more processors. The radio network node is configured according to any one of the radio network nodes described above.

According to another aspect, a wireless device comprising processing circuitry is provided. The processing circuitry comprises memory and one or more processors. The wireless device is configured according to any one of the wireless devices described above.

According to another aspect, a user equipment comprising processing circuitry is provided. The processing circuitry comprises memory and one or more processors. The user equipment is configured according to any one of the user equipment described above.

According to another aspect, a base station comprising processing circuitry is provided. The processing circuitry comprises memory and one or more processors. The base station is configured according to any one of the base stations described above.

According to another aspect, a computer program product is provided comprising a non-transitory computer readable storage medium having computer readable program code embodied in the medium. The computer readable program code comprises computer readable code to perform any one or more of the methods of examples above. According to another aspect, a carrier comprising the computer program is provided, wherein the carrier is one of an electronic signal, optical signal, radio signal, or computer readable storage medium. In some embodiments, a radio network node including processing circuitry contains instructions which, when executed, cause the radio network node to perform any of the methods of the example embodiments described above.

According to another aspect, a non-transitory computer readable memory configured to store executable instructions for a radio network node is provided. The executable instructions when executed by one or more processors of the processing circuitry cause the radio network node to perform any of the methods described above.

According to another aspect, a non-transitory computer readable memory configured to store executable instructions for a wireless device is provided. The executable instructions when executed by one or more processors of the processing circuitry cause the wireless device to perform any of the methods described above.

According to another aspect, a non-transitory computer readable memory configured to store executable instructions for a user equipment is provided. The executable instructions when executed by one or more processors of the processing circuitry cause the user equipment to perform any of the methods described above.

According to another aspect, a non-transitory computer readable memory configured to store executable instructions for a base station is provided. The executable instructions when executed by one or more processors of the processing circuitry cause the base station to perform any of the methods described above.

According to yet another aspect, a radio network node is provided. The radio network node includes a measurement module configured to determine at least one precoder from a first codebook by measuring on a set of beamformed antenna ports. The measurement module is further configured to determine at least one precoder from a second, multi-beam, codebook by measuring on a set of non-precoded antenna ports that is larger than the set of beamformed antenna ports. The at least one precoder in the first codebook shares one or more common components with the at least one precoder in the second codebook.

According to another aspect, a wireless device is provided. The wireless device includes a transceiver module configured to access a first codebook, the first codebook being a multi-beam codebook comprising a plurality of components. The transceiver module is further configured to access a second codebook, the second codebook comprising a subset of the plurality of components from the first codebook.

According to yet another aspect, a radio network node is provided. The radio network node includes a measurement module configured to determine at least one precoder 30 from a first codebook by measuring on a set of beamformed antenna ports, the at least one precoder in the first codebook sharing one or more common components with at least one precoder in a second, multi-beam, codebook.

According to another aspect, a wireless device is provided. The wireless device includes a transceiver module configured to access a first codebook, the first codebook being a multi-beam codebook comprising a plurality of components, a subset of the plurality of components from the first codebook being within a second codebook.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
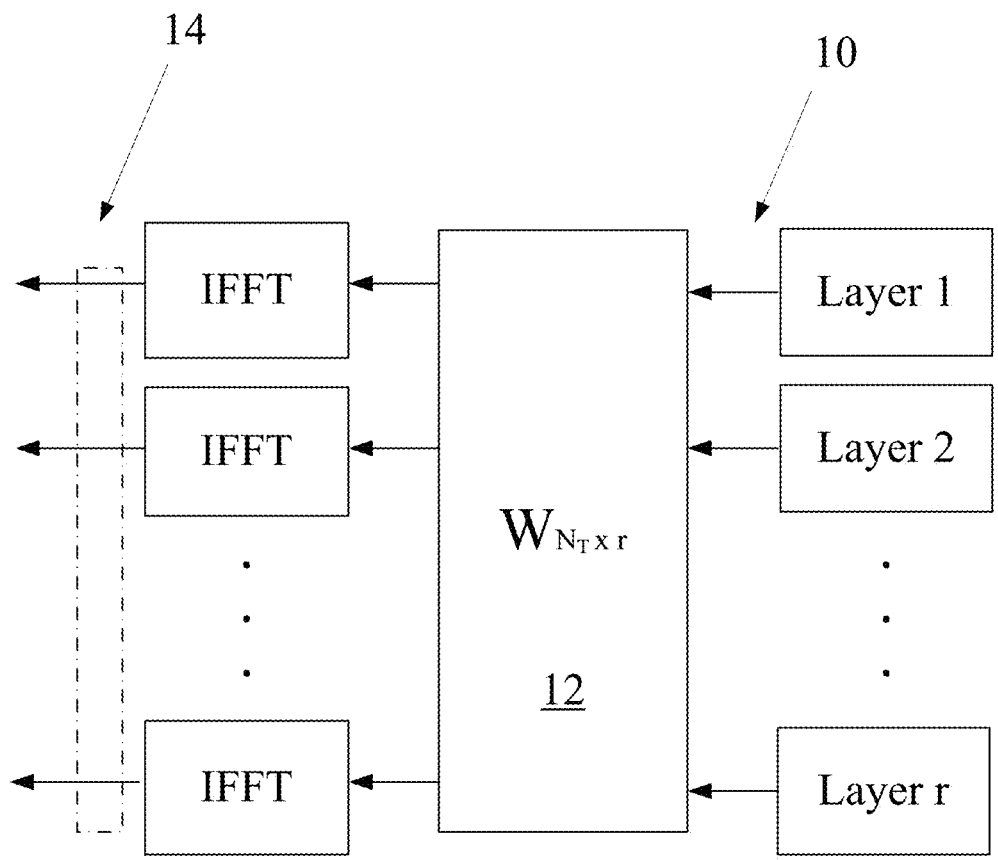
FIG. 1 is a block diagram of a system for spatial multiplexing.
Figure 2:
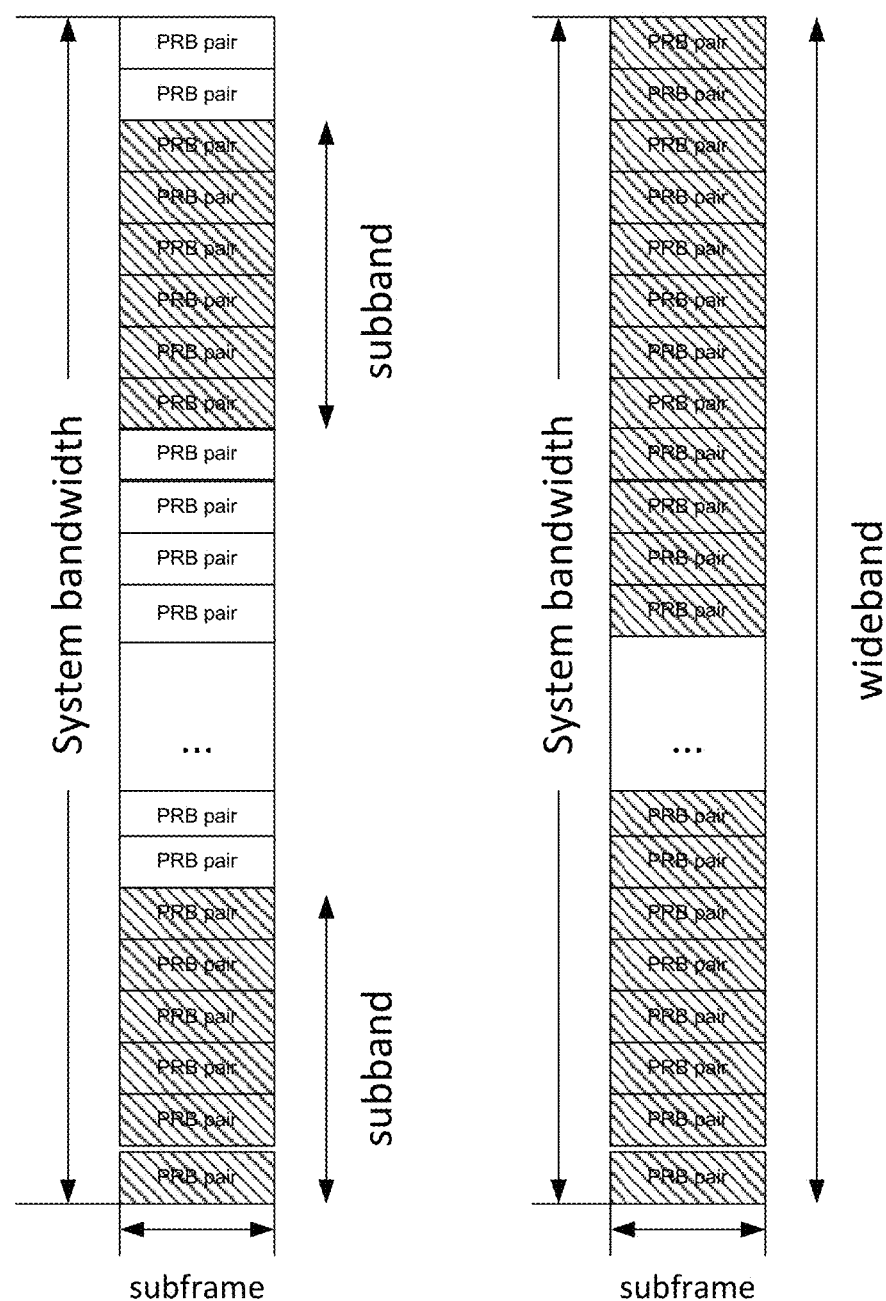
FIG. 2 is a diagram of partitioning of system bandwidth.
Figure 3:
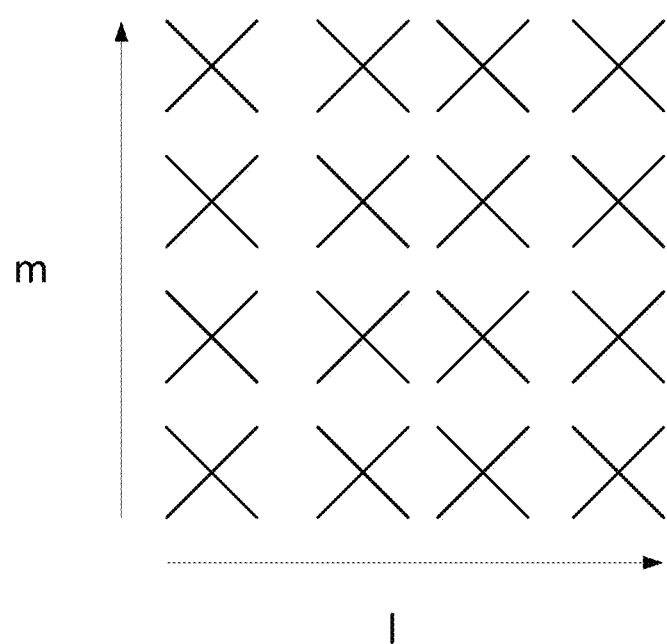
FIG. 3 is 4×4 array of dual-polarized antennas.
Figure 4:
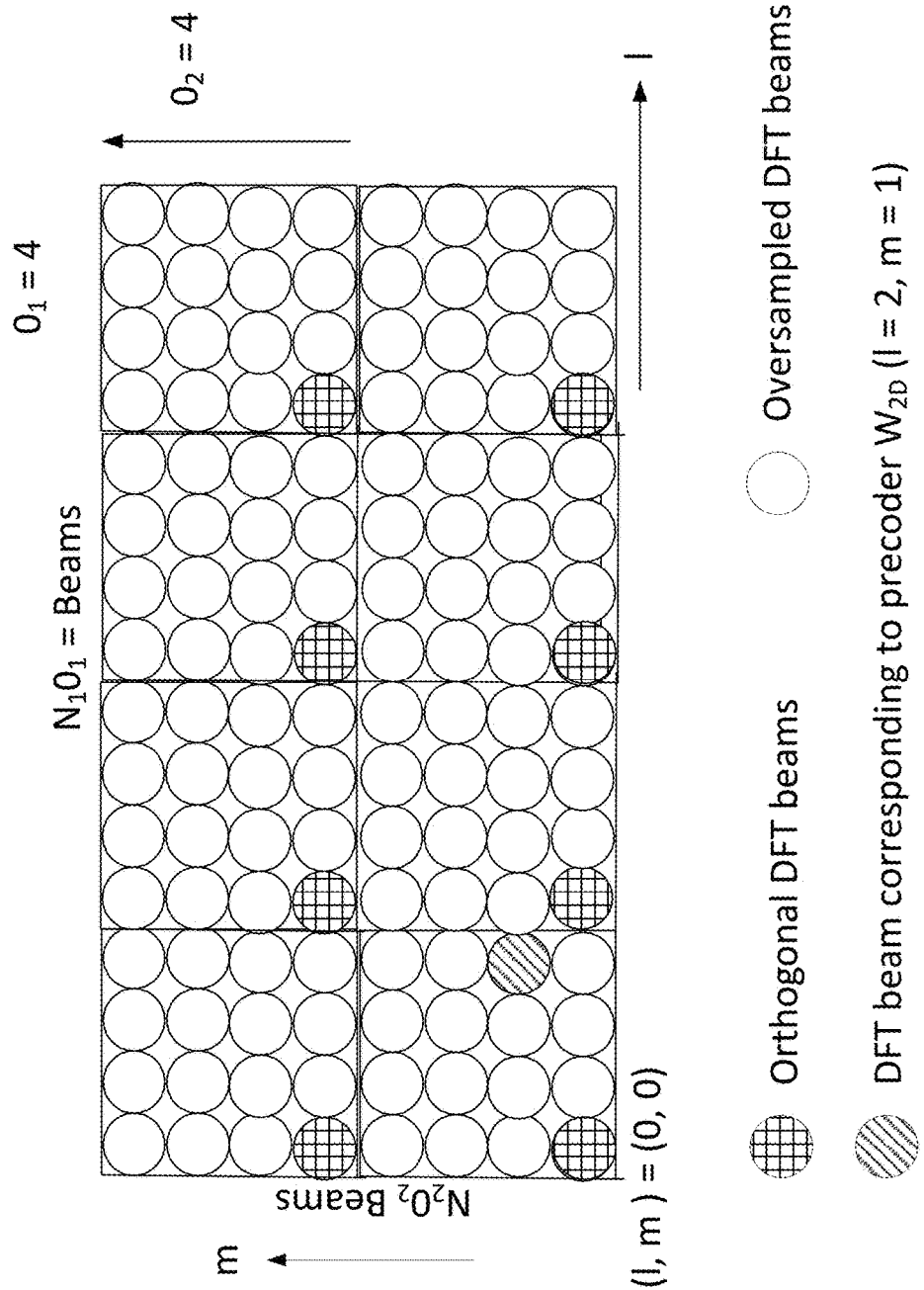
FIG. 4 is a grid of DFT beams.
Figure 5:
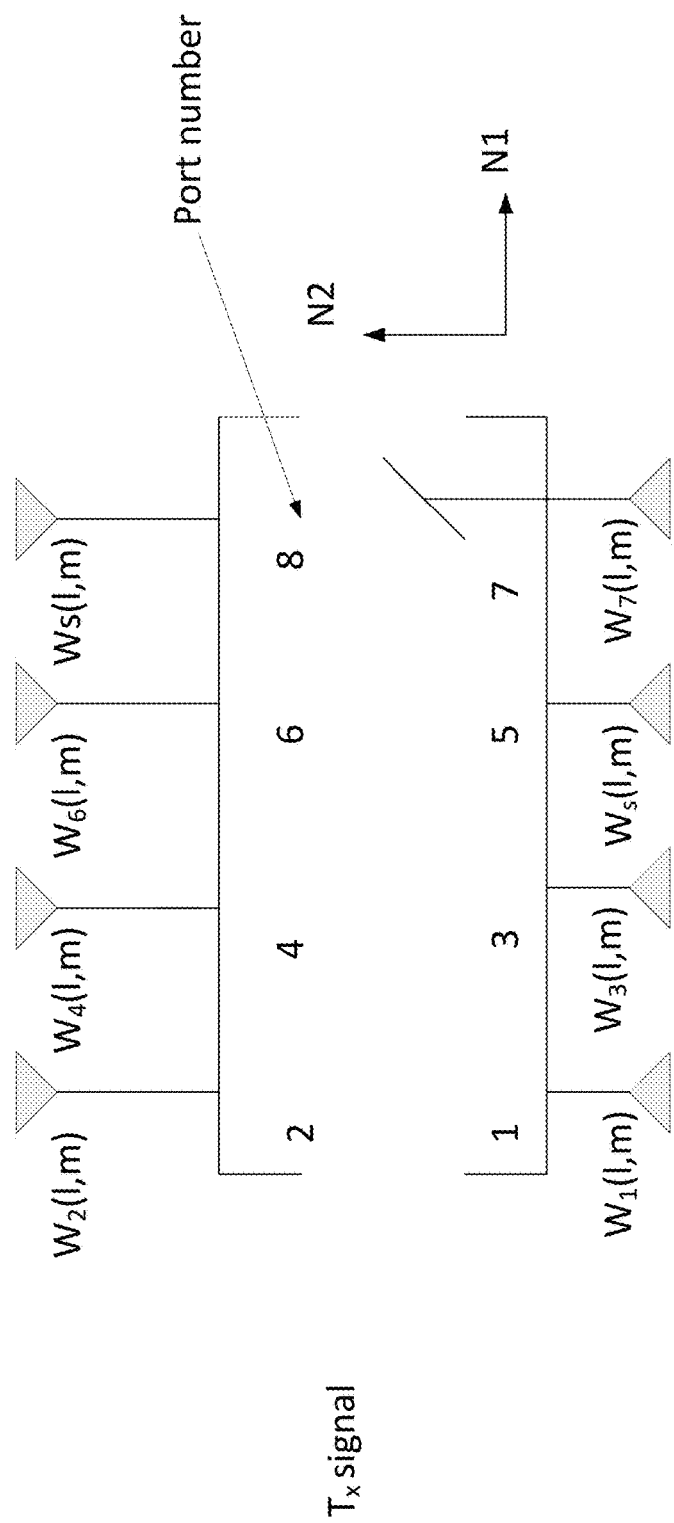
FIG. 5 illustrates mapping of antenna ports.

The term wireless device used herein may refer to any type of wireless device communicating with a network node and/or with another wireless device in a cellular or mobile communication system. Examples of a wireless device are a user equipment (UE), target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

The term "network node" used herein may refer to a radio network node or another network node, e.g., a core network node, MSC, MME, O&M, OSS, SON, positioning node (e.g. E-SMLC), MDT node, etc.

The term "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), gNodeB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Note further that functions described herein as being performed by a wireless device or a network node may be distributed over a plurality of wireless devices and/or network nodes.

Before describing in detail exemplary embodiments, it is noted that the embodiments reside primarily in combinations of apparatus components and processing steps related to advanced CSI reporting for hybrid class A/B operation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

This disclosure considers advanced CSI feedback with Hybrid Class A/B operation. For Class A CSI reporting a multi-beam precoder codebook may be used, as described in the introduction section, where the Class A precoders W may be constructed by linearly combining a set of beam components, where both a beam power allocation and beam co-phasing is used. The rank-1 precoders in such a codebook may be expressed as, for instance, $$W = [b_{I_S(1)} \ b_{I_S(2)} \ \ldots \ b_{I_S(N_{SP})}] \begin{bmatrix} 1 & 0 & & \\ 0 & \sqrt{p_2} & & \ddots \\ & & \ddots & 0 \\ & \ddots & 0 & \sqrt{p_{N_{SP}}} \end{bmatrix} \begin{bmatrix} 1 \\ e^{j\alpha_2} \\ \vdots \\ e^{j\alpha_{N_{SP}}} \end{bmatrix} =$$

$$W_1 W_2 = B_{I_S} \sqrt{P} \ W_2.$$

In some embodiments, the beam power level may be included in $W_2$. It is noted that there are many equivalent ways of expressing a precoder codebook structure comprising constructing the precoders by linearly combining a set of beam components and, the specific codebook structure used herein should be regarded as an example of such a codebook structure but some principles of the disclosure are applicable to other codebook structures as well. On a similar note, only rank-1 precoders are used in the examples and explanations herein, but some principles of the disclosure are applicable to codebooks with precoders of any rank.

In Hybrid Class A/B operation, it is typical to beamform the Class B CSI-RS with the UEs reported $w_1$ matrix from the corresponding Class A CSI report, i.e. $B_{I_S}\sqrt{P}$ in the example Class A multi-beam codebook above. The wireless device would then determine another precoder from a Class B codebook based on measuring the beamformed CSI-RS antenna ports and report back the precoder selection to the eNB.

The present disclosure presents methods for precoder determination and designs for Class B precoder codebooks tailored towards Hybrid Class A/B operation where precoders or precoder components (such as matrix factors) from a multi-beam codebook is reported by the wireless device in the Class A CSI report.

In all embodiments of the present disclosure, the precoders in the codebook for Class B reporting shares one or more common components with the multi-beam codebook used for Class A reporting to assure efficient Hybrid Class A/B operation.

Said shared components may in some embodiments comprise matrix factor or components that may be equivalently expressed by matrix factors. In some embodiments, the shared components may comprise power scaling components and/or phase scaling components.

In the prior art, typically Class A and Class B codebooks have separate designs and do not share common components. This approach may work sufficiently well for non-advanced, single-beam, Class A codebooks. However, for advanced CSI reporting with multi-beam Class A codebooks, the prior art approach may result in significant performance losses and a commonality between Class A and Class B codebooks is desired for efficient Hybrid Class A/B operation.

In one embodiment, the Class A precoder codebook comprises a beam selection component (expressed e.g. as a matrix $B_{I_S} = [b_{I_S(1)} \ b_{I_S(2)} \ \ldots \ b_{I_S(N_{SP})}]$ or equivalently), a beam power scaling component $$\left( \text{expressed e.g. as a matrix } \sqrt{P} = \begin{bmatrix} 1 & 0 & & \\ 0 & \sqrt{p_2} & & \ddots \\ & & \ddots & 0 \\ & \ddots & 0 & \sqrt{p_{N_{SP}}} \end{bmatrix} \text{ or equivalently} \right)$$

and a beam phase scaling component (expressed e.g. as a $W_2$ matrix). In this embodiment, the Class B codebook is designed by removing the beam selection component from the Class A codebook, but otherwise using a similar design, so that the precoders in the Class B codebook may be expressed as $W = \sqrt{P} w_2$. Thus, the Class B codebook in this embodiment comprises an antenna port power scaling component, which may or may not be selected on a wideband basis, and an antenna port phase scaling component. With such as Class B codebook design, efficient Hybrid Class A/B operation may be achieved, since the commonality between Class A and Class B codebooks simplifies both eNB and wireless device implementation and ensures that precoding performance with Hybrid Class A/B operation can reach the same level as Class A operation. With this type of operation, the eNB would typically not include a beam power scaling in when beamforming the Class B CSI-RS, as such a power scaling is applied by the wireless device when selecting the precoder from the Class B codebook. Instead, only the beam selection component of the corresponding Class A report, $B_{I_S}$, may be used by the eNB when determining the beamforming on the Class B CSI-RS. Hence, by applying a port to antenna virtualization in such a way that each port is mapped to a certain beam $b_{I_S(1)}$, from the $B_{I_S}$ in the corresponding Class A report, the class B codebook $W = \sqrt{P} w_2$ will be able to create the same set of resulting precoders as the class A report, for the given choice of $B_{I_S}$, since P and $W_2$ are shared between class A and class B.

In another set of embodiments, the same Class A codebook as described previously is used, but the Class B codebook contains only a shared phase scaling component, i.e. the precoders in the Class B codebook may be described as $W = W_2$. However, for good precoding performance with multi-beam codebooks, beam power scaling would generally have to be applied. The following embodiments disclose various methods for accounting for beam power scaling, even if the Class B codebook does not include such a component.

In one such embodiment, the eNB uses the power scaling component in the reported Class A precoder to set a different power level on the beamformed Class B antenna ports. Hence, one could here apply a port to antenna virtualization in such a way that each port is mapped to a certain beam from $B_{I_S}\sqrt{P}$ in the corresponding Class A report. Hence, the class B codebook $W = W_2$ will then be able to create the same set of resulting precoders as the class A report, for the given choice of $B_{I_S}\sqrt{P}$, since $w_2$ are shared between class A and class B.

In another such embodiment, the wireless device stores the power scaling component of the reported Class A precoder. When the wireless device subsequently measures the beamformed Class B antenna ports (which are assumed to be transmitted with equal power allocation on each port), the wireless device first applies the stored power scaling from the Class A report on top of the measured Class B antenna ports before determining the Class B precoder. Thus, the power scaling selected by the wireless device in the Class A report may be seen as semi-persistent, so that the wireless device assumes that the beam selection component in the Class A precoder report is used to beamform the Class B CSI-RS.

In yet another such embodiment, the eNB transmits the Class B antenna ports with equal power on each of the ports, but instead signals a power scaling to the wireless device that should be applied on top of the Class B antenna ports.

In another set of embodiments, the same Class A codebook as described previously is used, but the Class B codebook contains only a shared power scaling component, i.e. the precoders in the Class B codebook may be described as W=diag(P). Hence, here one could instead decide on $B_{I_s}$ and $W_2$ from the class A report and then adjust the power allocation based on the report from the class B report.

Figure 6:
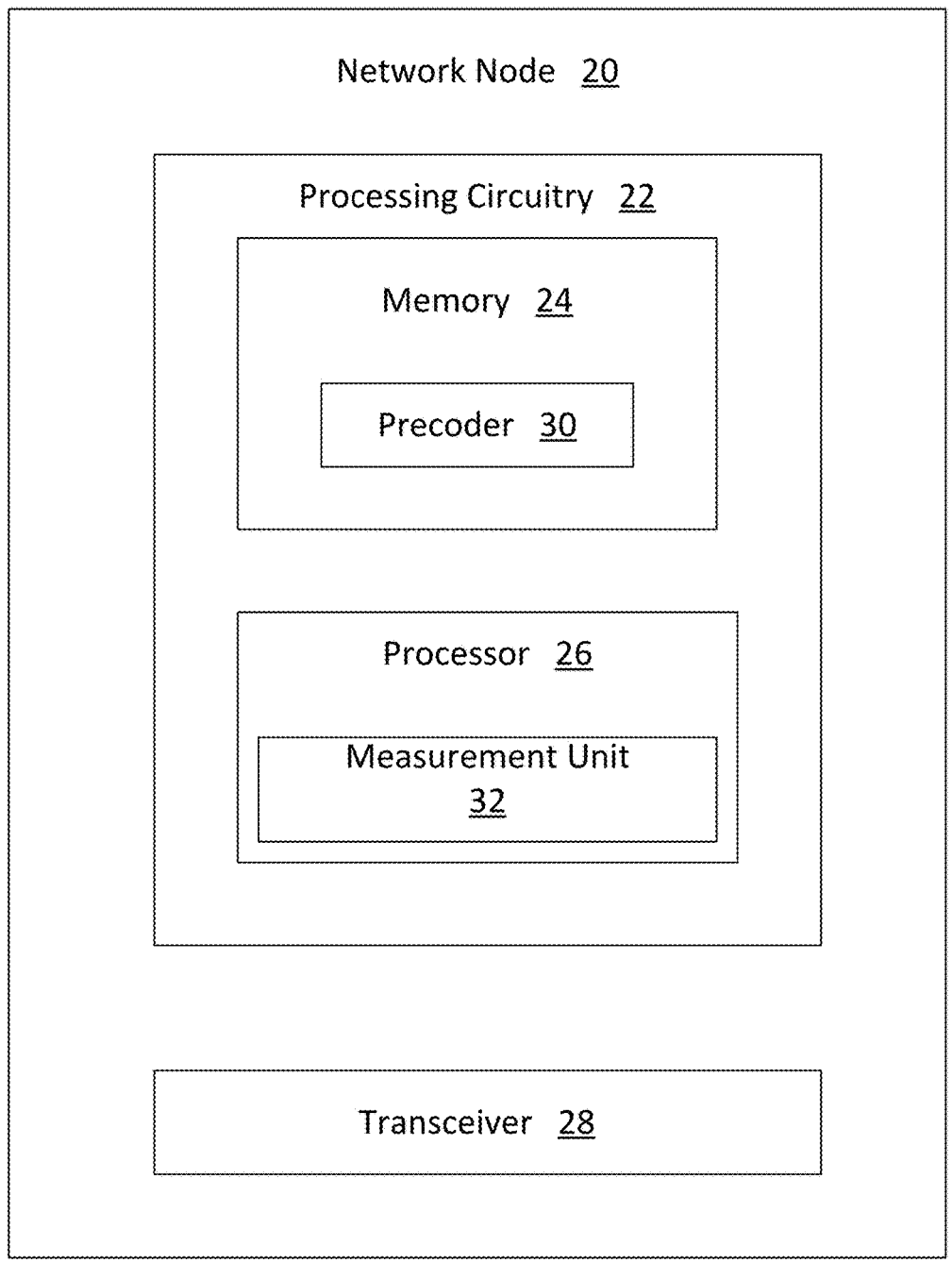
FIG. 6 is a block diagram of a network node.

FIG. 6 is a block diagram of a network node 20 configured to determine a configuration of a wireless device. The network node 20 has processing circuitry 22. In some embodiments, the processing circuitry may include a memory 24 and processor 26, the memory 24 containing instructions which, when executed by the processor 26, configure processor 26 to perform the one or more functions described herein, including those relating to determining a configuration of a wireless device. In addition to a traditional processor and memory, processing circuitry 22 may include integrated circuitry for processing and/or control, e.g., one or more processors and/or processor cores and/or FPGAs (Field Programmable Gate Array) and/or ASICs (Application Specific Integrated Circuitry).

Figure 7:
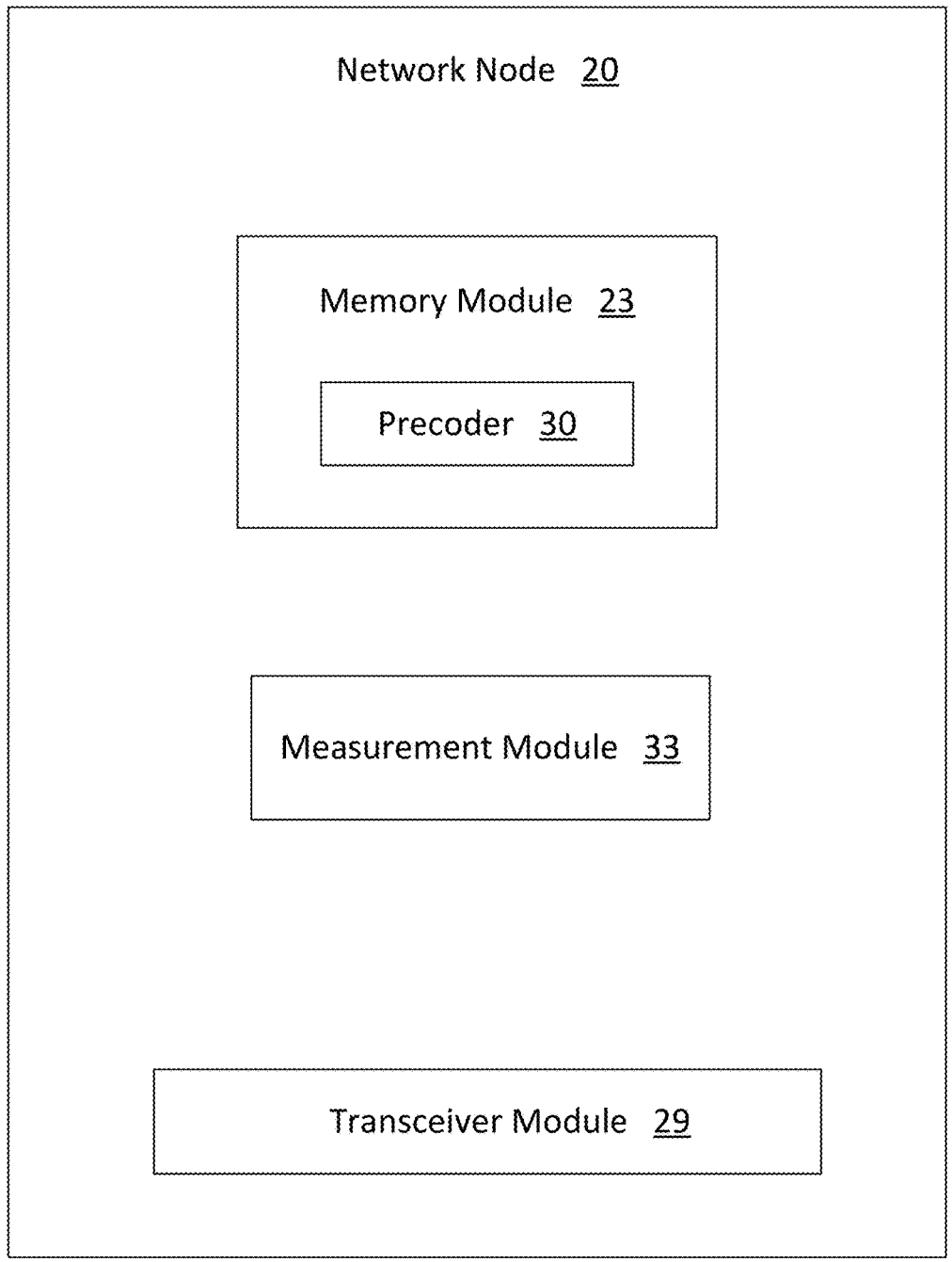
FIG. 7 is a block diagram of an alternative embodiment of a network node.

Processing circuitry 22 may comprise and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may include a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible. In one embodiment, the memory 24 stores a precoder 30 and the processor executes an algorithm of a measurement unit 32 to implement the procedures described above. The network node also includes a transceiver module 29 transmitting and receiving signals between the network node 20 and the wireless device 40. FIG. 7 is a block diagram of an alternative embodiment of the network node 20 having a memory module 23 storing the precoder 30 and having a measurement module 33 which may be a software module.

Figure 8:
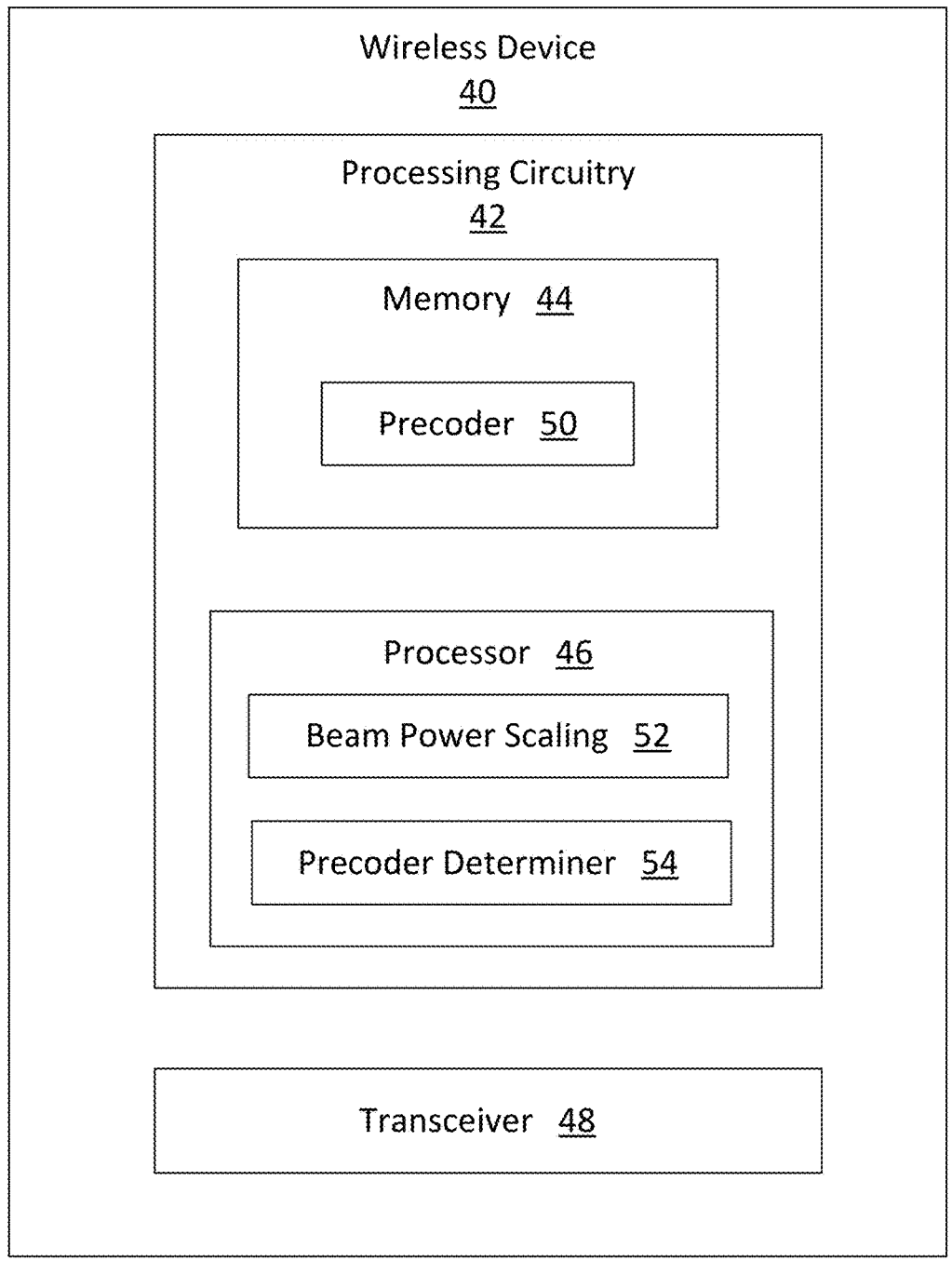
FIG. 8 is a block diagram of a wireless device.

FIG. 8 is a block diagram of an embodiment of a wireless device 40. The wireless device 40 includes processing circuitry 42 which includes a memory 44 and a processor 46. The memory 44 stores a precoder 50 and the processor 46 performs beam power scaling 52 and precoder determination 54. The wireless device also includes a transceiver 48 for transmitting and receiving signals between the network node 20 and the wireless device 40.

Figure 9:
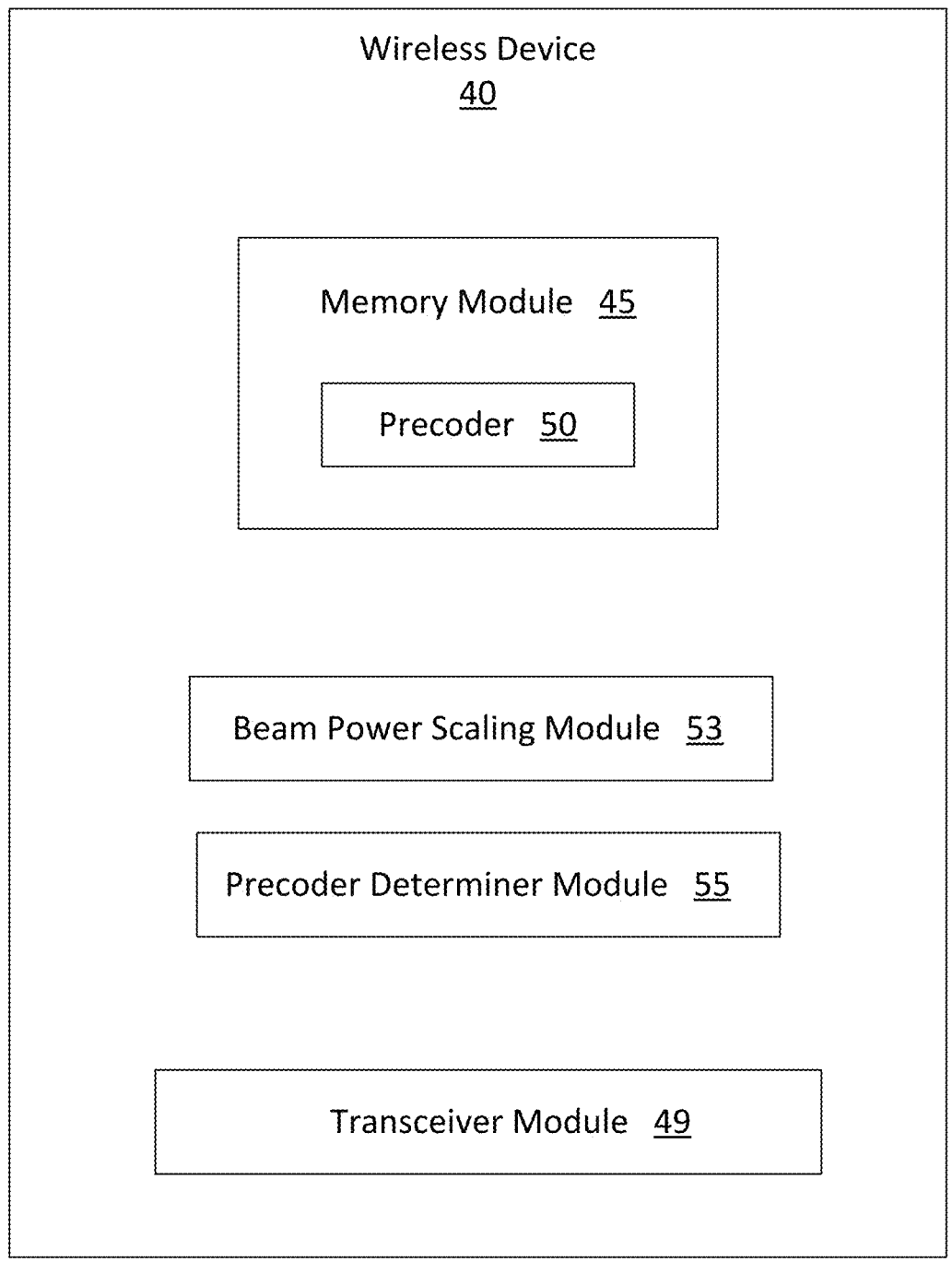
FIG. 9 is a block diagram of an alternative embodiment of a wireless device.

FIG. 9 is a block diagram of an alternative embodiment of the wireless device 40 which includes a memory module 45 that stores a precoder 50. The wireless device 40 also includes software modules 53 and 55 for performing beam power scaling and precoder determination. The wireless device 40 also includes a transceiver module 49 for communicating with a network node and other wireless devices.

Figure 10:
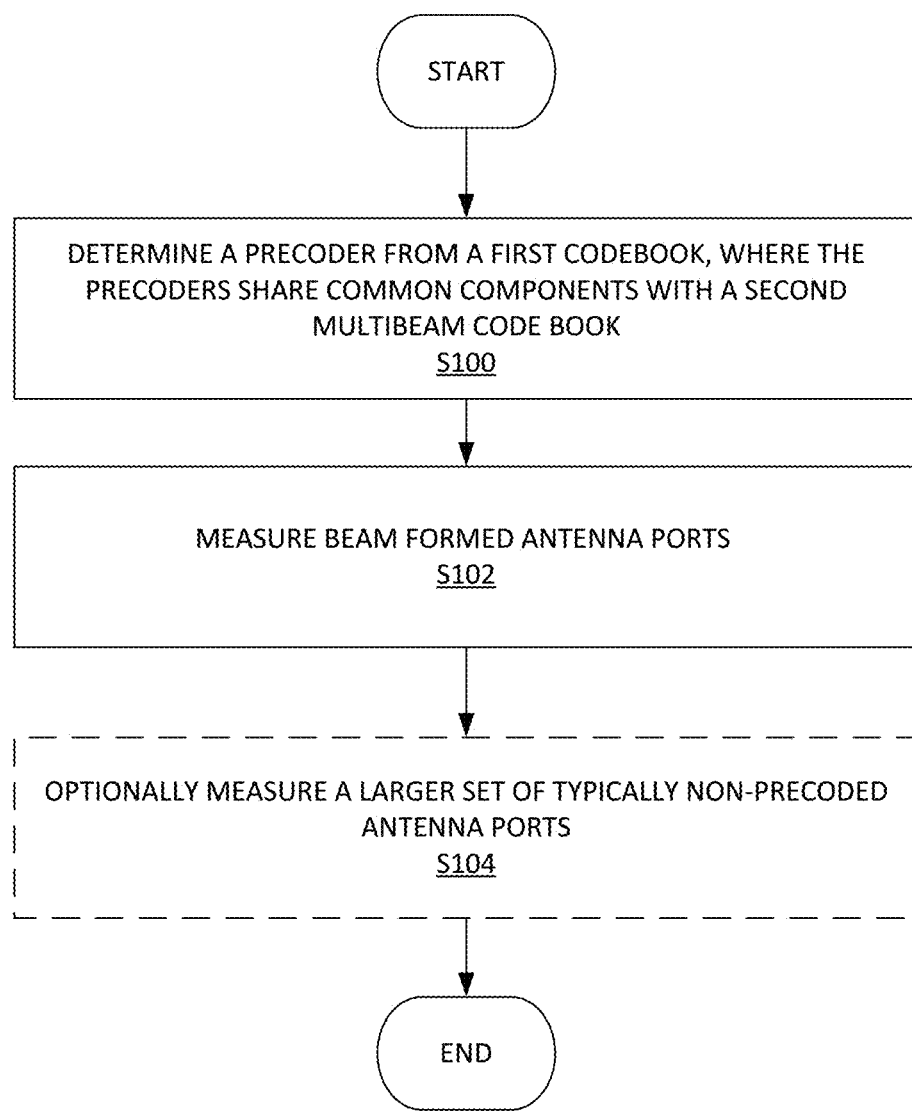
FIG. 10 is a flowchart of an exemplary process in a network node for advanced CSI reporting targeting a use of hybrid non-precoded and beamformed CSI reference signals.

FIG. 10 is a flowchart of an exemplary process in a network node for advanced CSI reporting targeting a use of hybrid non-precoded and beamformed CSI reference signals. The process includes determining a precoder from a first codebook where the precoders share common components with a second multibeam code book (block S100). The process also includes measuring beam formed antenna ports (block S102). The process may optionally include measuring a larger set of typically non-precoded antenna ports (block S104).

Figure 11:
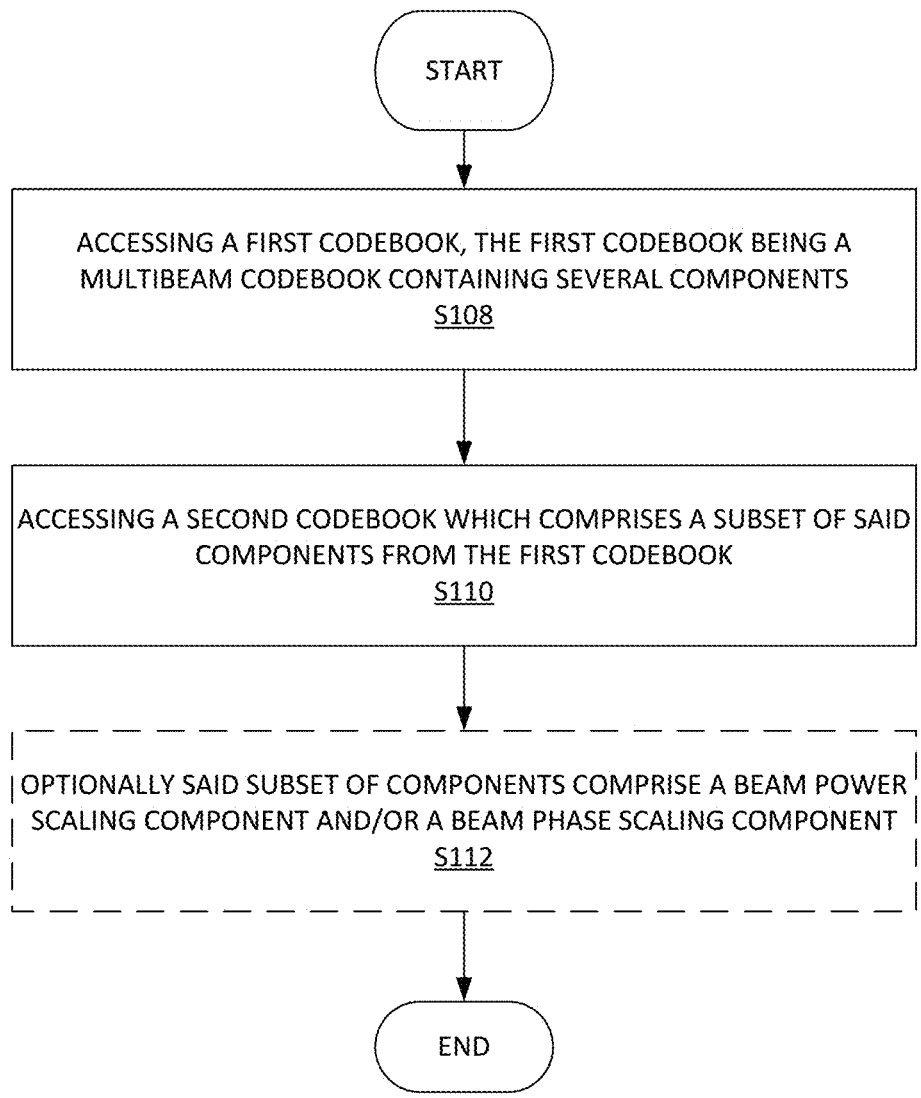
FIG. 11 is a flowchart of an exemplary process in a wireless device for codebook determination.

FIG. 11 is a flowchart of an exemplary process in a wireless device for codebook determination. The process includes accessing a first codebook, the first codebook being a multibeam codebook containing several components (block S108). The process also includes accessing a second codebook which comprises a subset of said components from the first codebook (block S110). The process also optionally includes that the subset of components comprise a beam power scaling component and/or a beam phase scaling component (block S112).

Some other embodiments are as follows:

Embodiment A1: A method of determining a precoder from a first codebook, where said precoder determination comprises measuring on a set of beamformed antenna ports, and where the precoders in the first codebook share one or more common components with precoders in a second, multi-beam, codebook and where determining precoders from the second codebook comprises measuring on a larger set of, typically non-precoded, antenna ports.

Embodiment A2: The method of Embodiment A1 where the one or more common components comprise a beam power scaling component and/or a beam phase scaling component.

Embodiment A3: The method of Embodiment A2, where the beam power scaling component of the first precoder is selected on a wideband basis and/or the beam phase scaling component is selected on a subband basis.

Embodiment A4: The method of Embodiment A1, where the one or more common components comprise a beam phase scaling component and where the said second codebook comprises a beam power scaling component.

Embodiment A5: The method of Embodiment A4, where a power scaling component comprised in said second precoder reported by the wireless device is used to scale the power level on the beamformed antenna ports by the transmitting network node.

Embodiment A6: The method of Embodiment A4, where the beam power scaling component of the second precoder reported by the wireless device is applied by the wireless device on the beamformed antenna ports before determining the first precoder.

Embodiment A7: The method of Embodiment A4, where an antenna port power scaling is signaled by the network node to the wireless device.

Embodiment B1: A method where a wireless device has access to a first codebook where said first codebook is a multi-beam codebook containing several components. The said wireless device also has access to a second codebook which comprises of a subset of said components from the said first codebook.

Embodiment B2: The method of Embodiment B1 where the said subset of components comprises a beam power scaling component and/or a beam phase scaling component.

Embodiment B3: The method of Embodiment B2, where the beam power scaling component of the second codebook is selected on a wideband basis and/or the beam phase scaling component is selected on a subband basis.

Embodiment B4: The method of Embodiment B1, where the said subset of components comprises a beam phase scaling component and where the said first codebook comprises a beam power scaling component.

Embodiment B5: The method of Embodiment B4, where the beam power scaling component in a precoder from the first codebook reported by the wireless device is applied by the wireless device on the beamformed antenna ports before determining a precoder from the second codebook.

Embodiment B6: The method of Embodiment B4, where an antenna port power scaling is signaled by the network node to the wireless device.

Embodiment C1: A method at a radio node of determining a precoder from a first codebook, comprising measuring on a set of beamformed antenna ports, and where the precoders in the first codebook share one or more common components with precoders in a second, multi-beam, codebook and where, optionally, determining precoders from the second codebook comprises measuring on a larger set of, typically non-precoded, antenna ports, wherein the radio node can be a radio access node or wireless device.

Embodiment C2: The method of Embodiment C1 where the one or more common components comprise a beam power scaling component and/or a beam phase scaling component.

Embodiment C3: The method of Embodiment C2, where the beam power scaling component of the first precoder is selected on a wideband basis and/or the beam phase scaling component is selected on a subband basis.

Embodiment C4: The method of Embodiment C1, where the one or more common components comprise a beam phase scaling component and where the said second codebook comprises a beam power scaling component.

Embodiment C5: The method of Embodiment C4, where a power scaling component comprised in said second precoder reported by the wireless device is used to scale the power level on the beamformed antenna ports by the transmitting network node.

Embodiment C6: The method of Embodiment C4, where the beam power scaling component of the second precoder reported by the wireless device is applied by the wireless device on the beamformed antenna ports before determining the first precoder.

Embodiment C7: The method of Embodiment C4, where an antenna port power scaling is signaled by the network node to the wireless device.

Embodiment D1: A method for a wireless device comprising: accessing a first codebook where said first codebook is a multi-beam codebook containing several components and, optionally, further comprising accessing a second codebook which comprises of a subset of said components from the said first codebook.

Embodiment D2: The method of Embodiment D1 where the said subset of components comprises a beam power scaling component and/or a beam phase scaling component.

Embodiment D3: The method of Embodiment B2, where the beam power scaling component of the second codebook is selected on a wideband basis and/or the beam phase scaling component is selected on a subband basis.

Embodiment D4: The method of Embodiment B1, where the said subset of components comprises a beam phase scaling component and where the said first codebook comprises a beam power scaling component.

Embodiment D5: The method of Embodiment B4, further comprising applying the beam power scaling component in a precoder from the first codebook reported on the beamformed antenna ports before determining a precoder from the second codebook.

Embodiment D6: The method of Embodiment B4, further comprising receiving an antenna port power scaling signaled (directly or indirectly) from a network node.

Embodiment E1: A node comprising circuitry, the node operable to perform any one or more of the methods of examples above.

Embodiment E2: The node of Embodiment E1, the circuitry comprising memory and one or more processors.

Embodiment E3: A computer program product comprising a non-transitory computer readable storage medium having computer readable program code embodied in the medium, the computer readable program code comprising computer readable code to perform any one or more of the methods of examples above.

Embodiment E4: A carrier containing the computer program of Embodiment E3, wherein the carrier is one of an electronic signal, optical signal, radio signal, or computer readable storage medium.

Embodiment E5: A node including circuitry containing instructions which, when executed, cause the radio network node to perform any of the method of the example embodiments described above.

Embodiment E6: A non-transitory computer readable memory configured to store executable instructions for a node, the executable instructions when executed by one or more processors cause the radio node to perform any of the method of the example embodiments described above.

Thus, some embodiments advantageously provide a method, a radio network node, a wireless device, and user equipment for advanced CSI reporting targeting a use of hybrid non-precoded and beamformed CSI reference signals. According to one aspect, a method for a radio network node 20 is provided. At least one precoder 30 from a first codebook is determined by the radio network node 20 by measuring on a set of beamformed antenna ports. At least one precoder 30 from a second, multi-beam, codebook is determined by the radio network node 20 by measuring on a set of non-precoded antenna ports that is larger than the set of beamformed antenna ports. The at least one precoder 30 in the first codebook shares one or more common components with the at least one precoder 30 in the second codebook.

According to this aspect, in some embodiments, the one or more common components comprise a beam power scaling component and/or a beam phase scaling component. In some embodiments, the beam power scaling component of a first precoder 30 of the at least one precoder 30 is selected on a wideband basis and/or the beam phase scaling component is selected on a subband basis. In some embodiments, the one or more common components comprise a beam phase scaling component and the said second codebook comprises a beam power scaling component.

According to another aspect, a method for a wireless device 40 is provided. A first codebook is accesses by the wireless device 40. The first codebook is a multi-beam codebook comprising a plurality of components. A second codebook is accessing by the wireless device 40. The second codebook comprises of a subset of the plurality of components from the first codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to yet another aspect, a method for a radio network node 20 is provided. At least one precoder 30 from a first codebook is determined by measuring on a set of beamformed antenna ports. The at least one precoder 30 in the first codebook shares one or more common components with the at least one precoder 30 in a second, multi-beam, codebook. The radio network node 20 is one of a radio access node and a wireless device 40.

According to this aspect, in some embodiments, the one or more common components comprise a beam power scaling component and/or a beam phase scaling component. In some embodiments, the beam power scaling component of a first precoder 30 of the at least one precoder 30 is selected on a wideband basis and/or the beam phase scaling component is selected on a subband basis. In some embodiments, the one or more common components comprise a beam phase scaling component and the said second codebook comprises a beam power scaling component.

According to another aspect, a method for a wireless device 40 is provided. A first codebook is accessed by the wireless device 40. The first codebook is a multi-beam codebook comprising a plurality of components. A subset of the plurality of components from the first codebook is within a second codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to yet another aspect, a radio network node 20 comprising processing circuitry 22 is provided. The processing circuitry 22 is configured to determine at least one precoder 30 from a first codebook by measuring on a set of beamformed antenna ports. The processing circuitry 22 is further configured to determine at least one precoder 30 from a second, multi-beam by measuring on a set of non-precoded antenna ports that is larger than the set of beamformed antenna ports. The at least one precoder 30 in the first codebook sharing one or more common components with the at least one precoder 30 in the second codebook.

According to this aspect, in some embodiments, the one or more common components comprise a beam power scaling component and/or a beam phase scaling component. In some embodiments, the beam power scaling component of a first precoder 30 of the at least one precoder 30 is selected on a wideband basis and/or the beam phase scaling component is selected on a subband basis. In some embodiments, the one or more common components comprise a beam phase scaling component and the said second codebook comprises a beam power scaling component.

According to another aspect, a wireless device 40 comprising processing circuitry 42 is provided. The processing circuitry 42 is configured to access a first codebook. The first codebook is a multi-beam codebook comprising a plurality of components. The processing circuitry 42 is further configured to access a second codebook. The second codebook comprises a subset of the plurality of components from the first codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to yet another aspect, a radio network node 20 comprising processing circuitry 22 is provided. The processing circuitry 22 is configured to determine at least one precoder 30 from a first codebook by measuring on a set of beamformed antenna ports. The at least one precoder 30 in the first codebook shares one or more common components with at least one precoder 30 in a second, multi-beam, codebook.

According to this aspect, in some embodiments, the one or more common components comprise a beam power scaling component and/or a beam phase scaling component. In some embodiments, the beam power scaling component of a first precoder 30 of the at least one precoder 30 is selected on a wideband basis and/or the beam phase scaling component is selected on a subband basis. In some embodiments, the one or more common components comprise a beam phase scaling component and the said second codebook comprises a beam power scaling component.

According to yet another aspect, a wireless device 40 comprising processing circuitry 42 is provided. The processing circuitry 42 is configured to access a first codebook. The first codebook is a multi-beam codebook comprising a plurality of components. A subset of the plurality of components from the first codebook is within a second codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to one aspect, a method for a base station 20 is provided. At least one precoder 30 from a first codebook is determined by the base station 20 by measuring on a set of beamformed antenna ports. At least one precoder 30 from a second, multi-beam, codebook is determined by the base station 20 by measuring on a set of non-precoded antenna ports that is larger than the set of beamformed antenna ports. The at least one precoder 30 in the first codebook shares one or more common components with the at least one precoder 30 in the second codebook.

According to this aspect, in some embodiments, the one or more common components comprise a beam power scaling component and/or a beam phase scaling component. In some embodiments, the beam power scaling component of a first precoder 30 of the at least one precoder 30 is selected on a wideband basis and/or the beam phase scaling component is selected on a subband basis. In some embodiments, the one or more common components comprise a beam phase scaling component and the said second codebook comprises a beam power scaling component.

According to another aspect, a method for a user equipment 40 is provided. A first codebook is accesses by the user equipment 40. The first codebook is a multi-beam codebook comprising a plurality of components. A second codebook is accessing by the user equipment 40. The second codebook comprises of a subset of the plurality of components from the first codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to yet another aspect, a method for a base station 20 is provided.

At least one precoder 30 from a first codebook is determined by measuring on a set of beamformed antenna ports. The at least one precoder 30 in the first codebook shares one or more common components with the at least one precoder 30 in a second, multi-beam, codebook. The base station 20 is one of a radio access node and a user equipment 40.

According to this aspect, in some embodiments, the one or more common components comprise a beam power scaling component and/or a beam phase scaling component. In some embodiments, the beam power scaling component of a first precoder 30 of the at least one precoder 30 is selected on a wideband basis and/or the beam phase scaling component is selected on a subband basis. In some embodiments, the one or more common components comprise a beam phase scaling component and the said second codebook comprises a beam power scaling component.

According to another aspect, a method for a user equipment 40 is provided. A first codebook is accessed by the user equipment 40. The first codebook is a multi-beam codebook comprising a plurality of components. A subset of the plurality of components from the first codebook is within a second codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to yet another aspect, a base station 20 comprising processing circuitry 22 is provided. The processing circuitry 22 is configured to determine at least one precoder 30 from a first codebook by measuring on a set of beamformed antenna ports. The processing circuitry 22 is further configured to determine at least one precoder 30 from a second, multi-beam by measuring on a set of non-precoded antenna ports that is larger than the set of beamformed antenna ports. The at least one precoder 30 in the first codebook sharing one or more common components with the at least one precoder 30 in the second codebook.

According to this aspect, in some embodiments, the one or more common components comprise a beam power scaling component and/or a beam phase scaling component. In some embodiments, the beam power scaling component of a first precoder 30 of the at least one precoder 30 is selected on a wideband basis and/or the beam phase scaling component is selected on a subband basis. In some embodiments, the one or more common components comprise a beam phase scaling component and the said second codebook comprises a beam power scaling component.

According to another aspect, a user equipment 40 comprising processing circuitry 42 is provided. The processing circuitry 42 is configured to access a first codebook. The first codebook is a multi-beam codebook comprising a plurality of components. The processing circuitry 42 is further configured to access a second codebook. The second codebook comprises a subset of the plurality of components from the first codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to yet another aspect, a base station 20 comprising processing circuitry 22 is provided. The processing circuitry 22 is configured to determine at least one precoder 30 from a first codebook by measuring on a set of beamformed antenna ports. The at least one precoder 30 in the first codebook shares one or more common components with at least one precoder 30 in a second, multi-beam, codebook.

According to this aspect, in some embodiments, the one or more common components comprise a beam power scaling component and/or a beam phase scaling component. In some embodiments, the beam power scaling component of a first precoder 30 of the at least one precoder 30 is selected on a wideband basis and/or the beam phase scaling component is selected on a subband basis. In some embodiments, the one or more common components comprise a beam phase scaling component and the said second codebook comprises a beam power scaling component.

According to yet another aspect, a user equipment 40 comprising processing circuitry 42 is provided. The processing circuitry 42 is configured to access a first codebook. The first codebook is a multi-beam codebook comprising a plurality of components. A subset of the plurality of components from the first codebook is within a second codebook.

According to this aspect, in some embodiments, the subset of the plurality of components comprises a beam power scaling component and/or a beam phase scaling component. In some embodiments, the beam power scaling component of the second codebook is selected on a wideband basis and/or the beam phase scaling component is selected on a subband basis. In some embodiments, the subset of the plurality of components comprises a beam phase scaling component and the first codebook comprises a beam power scaling component.

According to yet another aspect, a radio network node 20 comprising processing circuitry 22 is provided. The processing circuitry 22 comprises memory 24 and one or more processors 26. The radio network node 20 is configured according to any one of the radio network nodes 20 described above.

According to another aspect, a wireless device 40 comprising processing circuitry 42 is provided. The processing circuitry 42 comprises memory 44 and one or more processors 46. The wireless device 40 is configured according to any one of the wireless devices 40 described above.

According to another aspect, a user equipment 40 comprising processing circuitry 42 is provided. The processing circuitry 42 comprises memory 44 and one or more processors 46. The user equipment 40 is configured according to any one of the user equipment 40 described above.

According to another aspect, a base station 20 comprising processing circuitry 22 is provided. The processing circuitry 22 comprises memory 24 and one or more processors 26. The base station 20 is configured according to any one of the base stations 20 described above.

According to another aspect, a computer program product is provided comprising a non-transitory computer readable storage medium having computer readable program code embodied in the medium. The computer readable program code comprises computer readable code to perform any one or more of the methods of examples above. According to another aspect, a carrier comprising the computer program is provided, wherein the carrier is one of an electronic signal, optical signal, radio signal, or computer readable storage medium. In some embodiments, a radio network node 20 including processing circuitry 22 contains instructions which, when executed, cause the radio network node 20 to perform any of the methods of the example embodiments described above.

According to another aspect, a non-transitory computer readable memory configured to store executable instructions for a radio network node 20 is provided.

The executable instructions when executed by one or more processors 26 of the processing circuitry 22 cause the radio network node 20 to perform any of the methods described above.

According to another aspect, a non-transitory computer readable memory configured to store executable instructions for a wireless device 40 is provided. The executable instructions when executed by one or more processors 46 of the processing circuitry 42 cause the wireless device 40 to perform any of the methods described above.

According to another aspect, a non-transitory computer readable memory configured to store executable instructions for a user equipment 40 is provided. The executable instructions when executed by one or more processors 46 of the processing circuitry 42 cause the user equipment 40 to perform any of the methods described above.

According to another aspect, a non-transitory computer readable memory configured to store executable instructions for a base station 20 is provided. The executable instructions when executed by one or more processors 26 of the processing circuitry 22 cause the base station 20 to perform any of the methods described above.

According to yet another aspect, a radio network node 20 is provided. The radio network node 20 includes a measurement module 33 configured to determine at least one precoder 30 from a first codebook by measuring on a set of beamformed antenna ports. The measurement module 33 is further configured to determine at least one precoder 30 from a second, multi-beam, codebook by measuring on a set of non-precoded antenna ports that is larger than the set of beamformed antenna ports. The at least one precoder 30 in the first codebook shares one or more common components with the at least one precoder 30 in the second codebook.

According to another aspect, a wireless device 40 is provided. The wireless device 40 includes a transceiver module 49 configured to access a first codebook, the first codebook being a multi-beam codebook comprising a plurality of components. The transceiver module 49 is further configured to access a second codebook, the second codebook comprising a subset of the plurality of components from the first codebook.

According to yet another aspect, a radio network node 20 is provided. The radio network node 20 includes a measurement module 33 configured to determine at least one precoder 30 from a first codebook by measuring on a set of beamformed antenna ports, the at least one precoder 30 in the first codebook sharing one or more common components with at least one precoder 30 in a second, multi-beam, codebook.

According to another aspect, a wireless device 40 is provided. The wireless device 40 includes a transceiver module 49 configured to access a first codebook, the first codebook being a multi-beam codebook comprising a plurality of components, a subset of the plurality of components from the first codebook being within a second codebook.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations used in the preceding description include:
1D One dimensional
2D Two-Dimensional
3GPP Third Generation Partnership Project
5G Fifth Generation
ACK Acknowledgement
ASIC Application Specific Integrated Circuit
ARQ Automatic Retransmission Request
CA Carrier Aggregation
CB Codebook
CDMA Code Division Multiple Access
CFAI CSI Feedback Accuracy Indicator
CFI Control Information Indicator
CP Cyclic Prefix
CPU Central Processing Unit
CQI Channel Quality Indicators
CRS Common Reference Symbol/Signal
CSI Channel State Information
CSI-RS Channel State Information Reference Symbol/Signal
dB Decibel
DCI Downlink Control Information
DFT Discrete Fourier Transform
DL Downlink
eNB Enhanced or Evolved Node B
DP Dual Polarization
EPC Evolved Packet Core
EPDCCH Enhanced Physical Downlink Control Channel
EPRE Energy per Resource Element
E-UTRAN Evolved or Enhanced Universal Terrestrial Radio Access Network
BUD Frequency Division Duplexing
FD-MIMO Full Dimension MIMO
FFT Fast Fourier Transform
FPGA Field Programmable Gate Array
GSM Global System for Mobile Communications
HARQ Hybrid ARQ
ID Identifier
IFFT Inverse FFT
LSB Least Significant Bit
LTE Long Term Evolution
M2M Machine-to-Machine
MCS Modulation and Coding Scheme (or State)
MIMO Multiple Input Multiple Output
MME Mobility Management Entity
MSB Most Significant Bit
MU-MIMO Multi-User MIMO
NAK Non-Acknowledgement
NZP Non-Zero Power
OCC Orthogonal Cover Code
OPDM Orthogonal Frequency Division Multiplexing
PCFICH Physical Control Format Indicator Channel
PDA Personal Data Assistance
PDCCH Physical Downlink Control Channel
PDSCH Physical Downlink Shared Channel
PRB Physical Resource Block
PMI Precoder Matrix Indicator
PSK Phase Shift Keying
PUCCH Physical Uplink Control Channel
PUSCH Physical Uplink Shared Channel
QPSK Quadrature Phase Shift Keying
RB Resource Block
RE Resource Element
Rel Release
RI Rank Indicator
RRC Radio Resource Control
SINR Signal to Interference plus Noise Ratio
SNR Signal to Noise Ratio
SP Single Polarization
SR Scheduling Request
SU-MIMO Single User MIMO
TDD Time Division Duplexing
TFRE Time/Frequency Resource Element
TP Transmission Point
TS Technical Specification
Tx Transmit
UE User Equipment
UL Uplink
ULA Uniform Linear Array
UMB Ultra Mobile Broadband
UPA Uniform Planar Array
WCDMA Wideband Code Division Multiple Access
ZP Zero Power It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method for a user equipment, the method comprising:
accessing, by the user equipment, a first codebook, the first codebook being a multi-beam codebook comprising a plurality of components, a subset of the plurality of components from the first codebook being within a second codebook; and
measuring a channel state information—reference signal (CSI-RS), the CSI-RS based at least in part on the first codebook.

2. The method according to claim 1, wherein:
the subset of the plurality of components comprises at least one taken from the group consisting of a beam power scaling component and a beam phase scaling component.

3. The method according to claim 2, wherein at least one of:
the beam power scaling component of the second codebook is selected on a wideband basis; and
the beam phase scaling component is selected on a subband basis.

4. The method according to claim 1, wherein:
the subset of the plurality of components comprises a beam phase scaling component; and
the first codebook comprises a beam power scaling component.

5. A user equipment comprising:
processing circuitry configured to:
access, by the user equipment, a first codebook, the first codebook being a multi-beam codebook comprising a plurality of components;
access, by the user equipment, a second codebook, the second codebook comprising a subset of the plurality of components from the first codebook; and
measure a channel state information—reference signal (CSI-RS), the CSI-RS based at least in part on the first codebook.

6. The user equipment according to claim 5, wherein:
the subset of the plurality of components comprises at least one taken from the group consisting of a beam power scaling component and a beam phase scaling component.

7. The user equipment according to claim 6, wherein at least one of:
the beam power scaling component of the second codebook is selected on a wideband basis; and
the beam phase scaling component is selected on a subband basis.

8. The user equipment according to claim 5, wherein:
the subset of the plurality of components comprises a beam phase scaling component; and
the first codebook comprises a beam power scaling component.

9. A base station comprising:
processing circuitry configured to:
determine at least one precoder from a first codebook by measuring on a set of beamformed antenna ports, the at least one precoder in the first codebook sharing one or more common components with at least one precoder in a second, multi-beam, codebook.

10. The base station according to claim 9, wherein:
the one or more common components comprise at least one taken from the group consisting of a beam power scaling component and a beam phase scaling component.

11. The base station according to claim 10, wherein at least one of:
the beam power scaling component of a first precoder (30) of the at least one precoder is selected on a wideband basis; and
the beam phase scaling component is selected on a subband basis.

12. The base station (20) according to claim 9, wherein:
the one or more common components comprise a beam phase scaling component; and
the second codebook comprises a beam power scaling component.

13. A user equipment comprising:
processing circuitry configured to:
access, by the user equipment, a first codebook, the first codebook being a multi-beam codebook comprising a plurality of components, a subset of the plurality of components from the first codebook being within a second codebook; and
measure a channel state information—reference signal (CSI-RS), the CSI-RS based at least in part on the first codebook.

14. The user equipment according to claim 13, wherein:
the subset of the plurality of components comprises at least one taken from the group consisting of a beam power scaling component and a beam phase scaling component.

15. The user equipment according to claim 14, wherein at least one of:
the beam power scaling component of the second codebook is selected on a wideband basis; and
the beam phase scaling component is selected on a subband basis.

16. The user equipment according to claim 13, wherein:
the subset of the plurality of components comprises a beam phase scaling component; and
the first codebook comprises a beam power scaling component.

* * * * *